(12) United States Patent
Wu et al.

(10) Patent No.: US 8,306,092 B2
(45) Date of Patent: Nov. 6, 2012

(54) SPREADING SEQUENCES WITH DUAL LOW CORRELATION WINDOWS FOR QUASI-SYNCHRONOUS CODE-DIVISION MULTIPLE-ACCESS COMMUNICATIONS

(75) Inventors: Wei Hsiang Wu, Hong Kong (CN); Ho Yin Chan, Hong Kong (CN); Wai Ho Mow, Hong Kong (CN)

(73) Assignee: Kan Ling Capital, L.L.C., Wilmington, DE (US)

( * ) Notice: Subject to any disclaimer, the term of this patent is extended or adjusted under 35 U.S.C. 154(b) by 903 days.

(21) Appl. No.: 12/370,009

(22) Filed: Feb. 12, 2009

(65) Prior Publication Data

US 2010/0128757 A1    May 27, 2010

Related U.S. Application Data

(60) Provisional application No. 61/116,696, filed on Nov. 21, 2008.

(51) Int. Cl.
*H04B 1/00* (2006.01)
(52) U.S. Cl. ........ 375/146; 375/130; 375/133; 375/141; 375/279; 375/295
(58) Field of Classification Search .................. 375/146, 375/133, 141, 130, 279, 295
See application file for complete search history.

(56) References Cited

U.S. PATENT DOCUMENTS

| | | | | |
|---|---|---|---|---|
| 6,061,359 | A * | 5/2000 | Schilling et al. | 370/441 |
| 2003/0086489 | A1 * | 5/2003 | Hernandez et al. | 375/239 |
| 2006/0171447 | A1 * | 8/2006 | Alon et al. | 375/146 |

OTHER PUBLICATIONS

Chan et al, generalised Barker-like PN sequence for quasis-synchronus spread-spectrum multiple-access communication systems, 1995, vol. 142, Issue:2, pp. 91-98.*
Wu, et al. On the Construction of Sets of Orthogonal Optimal Sequences with Dual Low Correlation Zone Windows for M-PSK Modulation, Nov. 17, 2008, 18 pages.
Torii, et al. A New Class of Zero-Correlation Zone Sequences. IEEE Transactions on Information Theory, vol. 50, issue 3, Mar. 2004, pp. 559-565    http://ieeexplore.ieee.org/xpl/freeabs_all.jsp?arnurnber=1273669. Last accessed May 27, 2009, 7 pages.
Zhou, et al. A new family of optimal zero correlation zone sequences from Perfect Sequences Based on Interleaved Technique. 3rd International Workshop on Signal Design and Its Applications in Communications, IWSDA 2007. http://ieeexplore.ieee.org/xpls/abs_all.jsp?arnumber=4408356. Last accessed Feb. 27, 2005, 5 pages.

(Continued)

*Primary Examiner* — Ted Wang
(74) *Attorney, Agent, or Firm* — Turocy & Watson, LLP

(57) ABSTRACT

Sequence generation in wireless communication is provided for sequences having good aperiodic correlation properties. In particular, dual window quasi-Barker sequences are generated that possess at least some properties of Barker sequences. In addition, the sequences can be orthogonal to mitigate multiple access interference. Dual windowing allows the sequences even after being phase modulated by data to be recognized, provided that delay in transmission is large as compared to the correlation zone. In this regard, the sequences can be utilized in quasi-synchronous spread spectrum and/or code division multiple access (CDMA) signal communication to provide orthogonality while substantially eliminating inter-user and inter-symbol interference. In addition, unlike the single window low periodic correlation sequences, system overheads, such as cyclic prefix, need not be utilized in transmission as the data modulation effect can be accounted for by the dual windowing.

28 Claims, 11 Drawing Sheets

OTHER PUBLICATIONS

Fan. Spreading Sequence Design and Theoretical Limits for Quasisynchronous CDMA Systems, EURASIP Journal on Wireless Communications and Networking Volume 2004 (2004), Issue 1, pp. 19-31. http://portal.acm.org/citation.cfm?id=1086491. Last accessed Feb. 27, 2005, 17 pages.

Oppermann, et al. Complex Spreading Sequences with a Wide Range of Correlation Properties, IEEE Transactions on Communications, vol. 45, No. 3, Mar. 1997 http://ieeexplore.ieee.org/application/mdl/mdlconfirmation.jsp?arnumber=558701. Last accessed Feb. 27, 2005, 11 pages.

Oppermann. A Technique for Deriving Sets of Orthogonal Sequences From Binary Parents Which Preserves Auto-Correlation Properties. IEEE Communications Letters, vol. 6, Issue 10, Oct. 2002, pp. 416-418. http://ieeexplore.ieee.org/application/mdl/mdlconfirmation.jsp?arnumber=01042228. Last accessed Feb. 27, 2005, 3 pages.

Zhang, et al. New Sequence Pairs with Ear Zero Correlation Windows. IEEE International Conference on Communications, vol. 6, Jun. 20-24, 2004, pp. 3261-3264. http://ieeexplore.ieee.org/xpls/abs_all.jsp?arnumber=1313148. Last accessed Feb. 27, 2005, 4 pages.

Mow. Even-Odd Transformation with Application to Multiuser CW Radars. IEEE Transactions on Aerospace and Electronic Systems, vol. 35, No. 4, pp. 1466-1470, Oct. 1999. http://ieeexplore.ieee.org/stamp/stamp.jsp?tp=&arnumber=805465&isnumber=17457. Last accessed Feb. 27, 2005, 5 pages.

Luke, et al. Binary and Quadriphase Sequences With Optimal Autocorrelation Properties: A Survey. IEEE Transactions on Information Theory, vol. 49, No. 12, pp. 3271-3282, Dec. 2003. http://ieeexplore.ieee.org/application/mdl/mdlconfirmation.jsp?arnumber=1255553. Last accessed Feb. 27, 2005, 12 pages.

Fan, et al. Sequence Design for Communications Applications, Aug. 1996, Research Studies Press Ltd., John Wiley & Sons Inc. 48-494 pages.

Ho, et al. Searching for the Best Biphase and Quadriphase Quasi-Barker Sequences. Downloaded on Sep. 2, 2009 at 15:34 from IEEE Xplore, 43-47, 5 pages.

Fan, et al. Generalized Orthogonal Sequences and Their Applications in Synchronous CDMA Systems. IEICE Trans. Fundamentals. vol. E83-A, No. 11 Nov. 2000. pp. 2054-2069, 15 pages.

Fan, et al. Class of binary sequences with zero correlation zone—Electronics Letters May 13, 1999 vol. 35 No. 10, Last accessed on Sep. 3, 2009, pp. 777-779, 3 pages.

Deng et al. Spreading sequence sets with zero correlation zone—Electronics Letters May 25, 2000 vol. 36 No. 11, Last accessed on Sep. 3, 2009, pp. 993-994, 2 pages.

Fan, et al. On Optimal Training Sequence Design for Multi-Antenna Systems Over Dispersive Fading Channel and Its Extensions. IEEE transactions on Vehicular Technology, vol. 53, No. 5, Sep. 2004, pp. 1623-1626, Last accessed on Sep. 3, 2009, 4 pages.

Fan, et al. Spreading Sequence Design and Theoretical Limits for Quasisynchronous CDMA Systems. EURASIP Journal on Wireless Communications and Networking 2004:1, 19-31. Last accessed on May 27, 2009, 13 pages.

Zang et al., "Family size of orthogonal oppermann sequences," Electron. Lett., vol. 37, No. 10, pp. 631-632, 2001.

* cited by examiner

SPREADING SEQUENCES WITH DUAL LOW CORRELATION WINDOWS FOR QUASI-SYNCHRONOUS CODE-DIVISION MULTIPLE-ACCESS COMMUNICATIONS

CROSS-REFERENCE TO RELATED APPLICATIONS

This application claims priority to U.S. Provisional Application Ser. No. 61/116,696, filed on Nov. 21, 2008, entitled "SPREADING SEQUENCES WITH DUAL LOW CORRELATION WINDOWS FOR QUASI-SYNCHRONOUS CODE-DIVISION MULTIPLE-ACCESS COMMUNICATIONS," the entirety of which is incorporated herein by reference.

TECHNICAL FIELD

The present disclosure relates generally to wireless communications systems, and more particularly to applying sequences with low correlation zone in wireless communications.

BACKGROUND

Due to the broadcast nature of wireless communications systems, such as spread spectrum communications, radar, mobile device communications, etc., communicating devices need to differentiate between and/or synchronize with signals being transmitted by other devices in a given proximity. One way this can be accomplished is by applying sequences to data transmitted over a wireless communication system such that a receiver of the data can differentiate signals of disparate devices based on the sequences. In this regard, sequences with good aperiodic auto-correlation functions (ACF), such as Barker sequences, can be used to facilitate improved sequence recognition. Additionally, utilization of low correlation windows in the ACF has been suggested for synchronizing signals during data transmission; these sequences have a window centralized around an in-phase position where correlation sidelobes are minimized to satisfy the Barker condition. The aperiodic ACFs are considered when computing desired sequences achieving the largest window around the main lobe. Moreover, as signal propagation delays and other factors, such as inaccurate timing due to the use of low-cost oscillators, affect the ability to provide perfect synchronization among communicating devices, approximately synchronous or quasi-synchronous code division multiple access (QS-CDMA) systems have also been proposed restricting delay between users within one or a few chips.

Even so, the multipath delay spread can reach values such that additional mechanisms are required to mitigate interference caused by the delay spread. For example, the spread can be larger than half of the correlation zone, since the correlation value outside the conventional single low correlation zone is not constrained.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

Sequences with dual low correlation zones are provided that maintain low autocorrelation even with data modulation such that additional overhead, such as cyclic prefix, associated with the use of conventional (single) low correlation zone sequences are not necessary. The sequences can be orthogonal to mitigate multiple access interference, in one example. Moreover, the sequences provided can substantially preserve at least some Barker sequence properties of optimal aperiodic autocorrelation, as desired for signal recognition. According to one aspect, sorting criteria for searching the orthogonal sequences for desirable biphase and quadriphase sequences with dual windows are provided such that in-phase inter-user interference and inter-symbol interference in transmission are reduced where the maximum delay is less than the size of the dual window. In another example, sequence pairs with dual windows can be used in M-ary modulation with lowered interference of multipath effect. In another aspect, an orthogonal set of dual sequences can be provided based on the Oppermann Transform.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed. The claimed subject matter is intended to include all such aspects and their equivalents. Other advantages and novel features of the claimed subject matter can become apparent from the following detailed description when considered in conjunction with the drawings.

DETAILED DESCRIPTION

Figure 1:
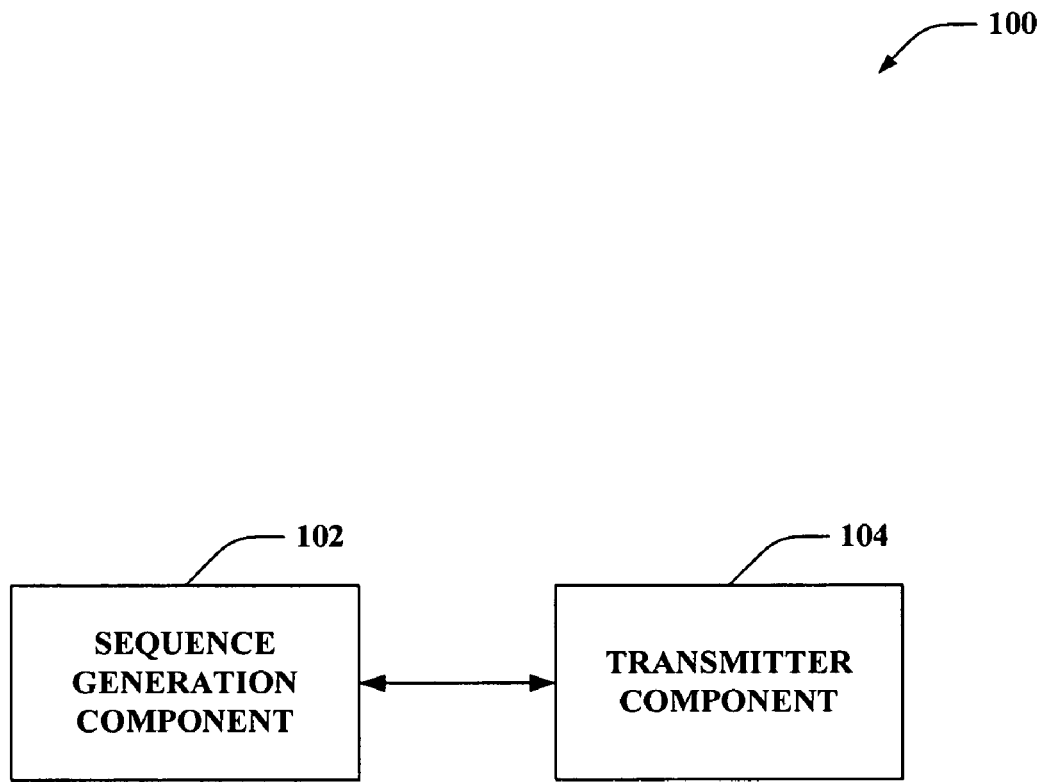
FIG. 1 illustrates a high-level block diagram of an example system that can generate and apply sequences to data for transmission over a wireless network.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, the methods and apparatus of the claimed subject matter, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the claimed subject matter. The components may communicate via local and/or remote processes such as in accordance with a signal having one or more data packets (e.g., data from one component interacting with another component in a local system, distributed system, and/or across a network such as the Internet with other systems via the signal).

Additionally, while the present disclosure generally relates to spread spectrum and code division multiple access (CDMA) communications systems, those skilled in the art will recognize that the claimed subject matter can be used and applied in any wired or wireless communication system that utilizes sequences to transmit and interpret data between devices. It is to be appreciated that the systems and/or methods described herein can be employed in any suitable wireless communication system and that all such systems are intended to fall within the scope of the hereto appended claims.

Overview

Many applications adopt sequences with good aperiodic autocorrelation functions (ACFs) in synchronizing signals in data transmission. In addition, Barker sequences can give optimal aperiodic autocorrelation. However, the existence of Barker sequences has found to be rare. Due to its usefulness in wide range of applications, modification has been made herein to loosen the strictly defined Barker condition in order to search for longer sequences.

Meanwhile, concepts of low correlation windows in the ACFs seem to have been employed. These sequences have a window centralized around the in-phase position of received signals where the correlation sidelobes are minimized to satisfy the Barker condition, and aperiodic ACFs are only considered when computing the desired sequences achieving the largest window around the mainlobe. As it can be difficult to achieve perfect synchronization among signals transmitted from the users to the base station due to different signal propagation delays, quasi-synchronous code division multiple access (QS-CDMA) systems therefore have been proposed recently in which the relative time delay between different users in QS-CDMA systems is restricted within one or a few chips.

Figure 2:
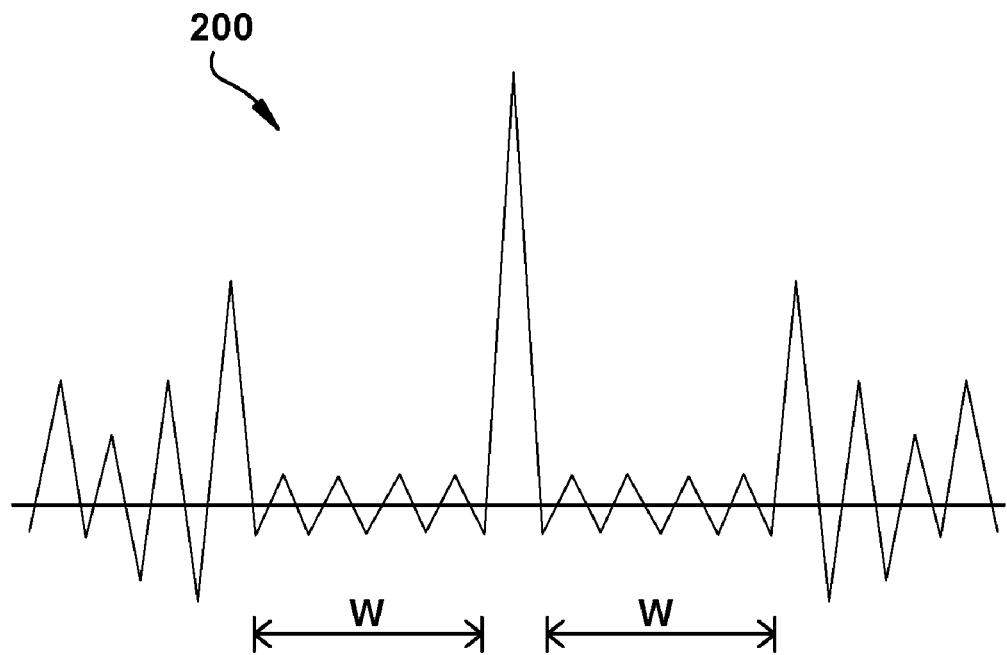
FIG. 2 illustrates exemplary graphs showing aperiodic autocorrelation function sums for single and dual window functions.
Figure 2:
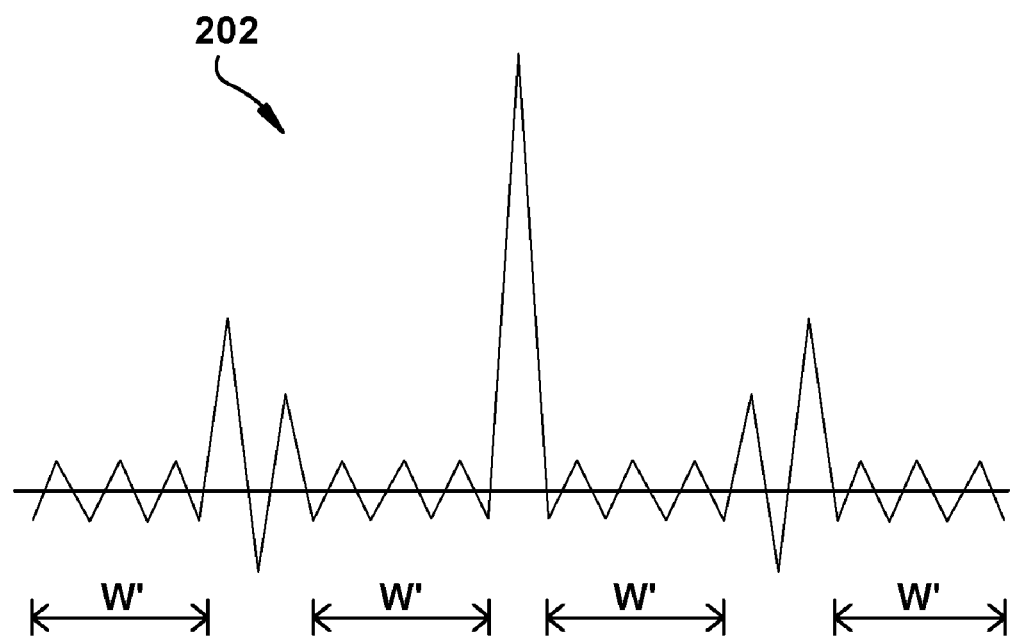

For those single low correlation window sequences, since only the periodic low correlation zone is considered, cyclic prefix or suffix is needed in order to significantly reduce interference in the presence of the data modulation effect. However, as cyclic prefix is a system overhead, the usage of this can degrade system performance in terms of data rate. It is desirable to have sequences with a property that besides the central low aperiodic correlation zone, when the delay is larger than a certain value, the aperiodic correlation of the sequence is also very low such that the interference to next symbols as a result of the periodic correlation of the data-modulated sequences is minimized. Thus, it is desirable to have sequences with two low correlation zones, as shown in FIG. 2 at 202 and described herein, as opposed to having one correlation zone shown at 200. With these sequences, cyclic prefix is no longer necessary. In addition, a single-user quasi-synchronous spread spectrum communication system can be viewed as the special case of a QS-CDMA system in which only one user is active so that there is no inter-user interference and a single dual low correlation window sequence, as described herein, can be applicable in this case.

Besides multipath interference, multiple access interference (MAI) is another concern. In order to mitigate MAI, it is desirable to have a set of sequences with low aperiodic cross- as well as auto-correlation zones. In the important special case of single-chip quasi-synchronism, it suffices to have an orthogonal set of sequences for user channelization. Moreover, each user wishes its sequence preserving the property of dual-window quasi-Barker sequence. Combining the two objectives, presented herein are orthogonal sets of dual-window quasi-Barker sequences.

As shown infra, results of the sorting criteria for optimal sequences in the case of dual low correlation windows based on the concept of quasi-synchronism. In approaches presented below for searching best biphase and quadriphase optimal sequences with dual windows, if the maximum delay is less than the size of the dual window, inter-symbol interference and inter-user interference in the transmission can be largely reduced. The sequences with dual windows can also be used in M-ary modulation with lowered interference of multipath effect. Moreover, shown below are an orthogonal set of dual windows sequences based on the Oppermann Transform, which is utilized to provide the orthogonal sets of dual-window quasi-Barker sequences.

A goal of sequence design is to obtain a set of sequences with both good autocorrelation and cross-correlation properties. For a system with M-PSK modulation scheme, each sequence in the set, essentially, has a total of M ACFs that need to be considered. For every pair of sequences in the set, a number of cross-correlation functions (CCFs) have to be considered as well. Hence, even if the set size is reasonably large, the problem becomes intractable because a large number of ACFs and CCFs have to be optimized simultaneously. As described herein, a special case is considered assuming the sequence set is orthogonal.

For the ACFs of each sequence in the set, considering a BPSK communication system as an example, in fact, both periodic and odd-periodic ACFs of a sequence have to be investigated. These two ACFs are natural consequences of data modulation using the sequence-inversion keying commonly adopted in CDMA systems. Note that periodic ACFs also appear at the output using periodic sequences with full duty cycle while the odd-periodic ACFs are obtained if the alternating inverse sequences are sent consecutively instead of periodic ones. Admittedly, only minimizing the sidelobe levels of aperiodic ACFs and periodic ACF is just a necessary but not a sufficient condition for guaranteeing those of periodic and odd-periodic ACFs being also minimal. Therefore, minimizing the sidelobe levels of both periodic and odd-periodic ACFs is the major concern for a BPSK modulation.

As mentioned before, in M-PSK modulation, substantially all the M ACFs of a sequence have to be taken into consideration. Since it is relatively difficult to minimize substantially all the correlation functions simultaneously, it is noteworthy that the necessary condition of minimizing the sidelobe levels of aperiodic ACFs provides can achieve the objective. If certain sequences are found to satisfy certain level of peak sidelobe values in the aperiodic case, it is substantially guaranteed that the maximum magnitudes of those in all the correlation are at most twice the magnitudes than that of the aperiodic ACFs.

In designing this set of optimal sequences, in order to fully realize the advantage of attaining a high degree of mis-synchronization in QS-CDMA systems, a consideration of dual low correlation windows in the form of FIG. 2 at 202 is introduced herein for achieving optimal results for all the correlation functions (particularly, periodic and odd-periodic ACFs for the BPSK scheme). Although it is generally agreed that the sidelobes in the low correlation windows around the origin (mainlobe) are important when designing the sequence set, however, the sidelobes in the terminal part of the ACFs are also important when investigating correlation values in ACFs. The sequences listed herein are found to have small signal energies within windows while the window sizes are maximized for allowing the largest degree of tolerance for signal mis-synchronization.

According to one aspect, an aim is to construct orthogonal set of sequences, where each sequence in the set has dual correlation zone windows. Still, even the set size is reasonably large, the construction problem becomes very difficult to solve because, on one hand, every sequence in the set has to contain dual correlation zone windows, and, on the other hand, the orthogonality between every pair of sequences has to be maintained. However, Opperman Sequences have been introduced to construct a set of orthogonal sequences based on one sequence. This technique, in one example, can be applied on the optimal sequences found, resulting in an orthogonal set of optimal sequences. Note that the dual windows property, as well as the minimized signal energies in the corresponding correlation functions with windows, is still preserved among substantially all sequences in the orthogonal set.

Referring to FIG. 1, a high-level block diagram of a wireless communication system 100 in accordance with various aspects presented herein is illustrated. In one example, the system 100 includes a sequence generation component 102 that can generate and apply one or more sequences described herein to utilize in communicating with one or more devices and a transmitter component 104 that modulates and/or transmits sequence applied data or signals. In one example, the sequence generation component 102 can receive a signal to transmit. The sequence generation component 102 can apply or associate a sequence described herein (e.g., utilizing one or more of the below formulae and/or tables) with the signal (e.g., in spreading the signal), and utilize the transmitter component 104 to transmit the signal to one or more devices. The sequence can be subsequently determined by a receiver and used to differentiate the transmission from that of other devices, estimate communication channels, synchronize communications between devices, and/or the like. It is to be appreciated that the components shown can be implemented in substantially any single or multiple carrier communication system, including but not limited to spread spectrum systems, radar, multiple access wireless systems, and/or the like.

Quasi-Barker Sequences

In one example, the output of a matched filter, without Doppler shift, is the aperiodic ACF, whose values for positive and negative delays are given by the first equation below. Usually, in the M-ary/DSSS system, the matched filter group in the receiver is designed for the same sequences as those used by the transmitter component 104. It is arranged in parallel and composed. In a real IEEE 802.11b system, the message is mixed with a Barker Sequence to spread the signal. The mixed signal is then modulated using BPSK (or QPSK) scheme and transmitted over the channel to the receiver where it is demodulated and mixed with the Barker sequence again to retrieve the original message.

Let $A_M = \{\exp(j2\pi k/M), k=0, \ldots, M-1\}$, where $j=\sqrt{-1}$, be an M-phase alphabet. Let $a=[a(0), a(1), \ldots, a(L-1)]$ with $a(n) \in A_M$, $\forall n \in \{0, 1, \ldots, L-1\}$ denote an M-phase sequence of length L. An M-phase sequence a is called a Barker sequence if its partial ACF defined by $$C_a(t) = \begin{cases} \sum_{n=o}^{L-t-1} a(n)a^*(n+t), & 0 \leq t \leq L-1 \\ \sum_{n=o}^{L-t+1} a(n)a^*(n-t), & 1-L \leq t < 0 \\ 0, & |t| \geq L \end{cases}$$

satisfies $$\max_{1 \leq t \leq L-2} |C_a(t)| \leq 1.$$

where x* denotes complex conjugate of complex number x. The peak sidelobe level PSL(a) of the sequence a can be expressed as $$PSL(a) = \max_{1 \leq t \leq L-1} \left| \sum_{n=0}^{L-t-1} a(n)a^*(n+t) \right|.$$

It is regarded as Barker sequence with peak sidelobe level less than or equal to one. Initially, define the window size W as L−2 for single window case, the above Barker condition can be rewritten as $$\max_{1 \leq t \leq W} |C_a(t)| \leq 1.$$

The original initial value of W for quasi-Barker condition can be set as L−2, which is the same as Barker condition. Since Barker sequences are rare due to its tight constraint, for any sequence of length L satisfying quasi-Barker condition for some window size, $1 \leq W \leq L-2$, are called window-W quasi-Barker sequences. The basis maximization problem over single window W, for finding quasi-Barker sequences, is $$\begin{aligned} \text{maximize} \quad & 1 \leq W \leq L-2 \\ \text{s.t.} \quad & |C_a(t)| \leq 1, \\ & \text{for } 1 \leq t \leq W \end{aligned}$$

The goal is to maximize the window size W by modifying the Barker condition, subject to the number of shifts considered in the sum of ACF cannot exceed the size of the correlation zone.

However, considering only a single window in the region around the mainlobe in the sum of ACFs is not appropriate because the terminal parts also have to be taken into account to meet the nature of quasi-synchronization. In a system with BPSK modulation scheme, since periodic and odd-periodic ACFs are natural consequences of data modulation using the sequence-inversion keying commonly adopted in CDMA systems, sequences are sending in the combination of positive and negative directions consecutively in the forms as ã= . . . ,a,a,a,a, . . .

or

â= . . . ,a,-a,a,-a, . . .

in which ã denotes the periodic continuation of a with period L and â represents the odd-periodic sequence resulting from ã by changing the sign of this sequence from period to period. In this context, the length of sequence a, namely L, can be referred to as the primitive period of ã and â. The periodic and odd-periodic ACFs are, respectively, defined as $$\check{C}_a(t) = \begin{cases} \sum_{n=0}^{L-1} a(n)\tilde{a}^*(n+t), & 0 \le t \le L-1 \\ \sum_{n=0}^{L-1} a(n)\tilde{a}^*(n-t)^*, & 1-L \le t < 0 \\ 0, & |t| \ge L \end{cases}$$

and $$\hat{C}_a(t) = \begin{cases} \sum_{n=0}^{L-1} a(n)\hat{a}^*(n+t), & 0 \le t \le L-1 \\ \sum_{n=0}^{L-1} a(n)\hat{a}^*(n-t), & 1-L \le t < 0 \\ 0, & |t| \ge L \end{cases}$$

For any given phase alphabet $A_M$ and any given length L, the maximization problem for M correlation functions with M-PSK modulation using dual windows W' for finding optimal sequences, is defined as $$\text{maximize } 1 \le W' \le (L-1)/2$$
$$\text{s.t.} \quad |C_a(t)| \le \alpha,$$
$$|\check{C}_a^i(t)| \le \beta,$$
$$\forall i = 1, 2, \ldots, M.$$

for $1 \le t \le W'$ and $(L-1)-W' \le t \le L-1$, where $\check{C}_a^i(t)$ represents the i-th generalized correlation function of sequence a for a system with M-PSK modulation scheme, and α and β are the parameters which can characterize the correlation properties of the solution. If α is set to two and β is set to one, the solution obtained is the optimal solution.

Construction of Orthogonal Sets of Dual Window Quasi-Barker Sequences

The set of Oppermann sequences $A_{m,p,l}(L)$ are defined as $A_{m,p,l}(L)=\{a_R: 1 \le R \le L\}$, where L is the sequence length, R is any integer that is relatively prime to L, $a_R$ is the R-th sequence in the set, and m, p, and l are any real numbers. In particular, where j is a complex number, the i-th element of the R-th sequence in $A_{m,p,l}(L)$, denoted by $a_R(i)$, is defined as:

$$a_R(i) = (-1)^{Ri} \exp\left(\frac{j\pi(R^m i^p + i^l)}{L}\right), 1 \le i \le L.$$

The parameters (m,p,l) can be set as (m,1,1) for the case of original Oppermann orthogonal sequences. Then the above equation becomes $$a_R(i) = (-1)^{Ri} \exp\left(\frac{j\pi(R^m + 1)i}{L}\right), 1 \le i \le L.$$

In addition, the term $(-1)^{Ri}$ can be modified to represent the terms of i-th chip of the original binary sequence b=(b(0), b(1), . . . , b(L-1)) in order to produce the generalized complex sequences. Actually, b need not only be binary and can be taken as any unimodular complex sequence, namely b(i) ∈ C. Denote b*(i) and |b(i)| as complex conjugate and modulus of b(i), respectively. Also, R is defined as any integer in [1,L-1]. Then the above formula can be rewritten as $$a_R(i) = b(i) \exp\left(\frac{j\pi(R^m + 1)i}{L}\right)$$

for $1 \le i \le L$, and b(i) ∈ C with |b(i)|=1. Note that the absolute aperiodic ACF of $a_R$ for all R is identical to that of b because the transform in the above formula is simply a linear phase shift transform.

One modification is shown that it is possible to obtain an orthogonal set of size L for sequences with odd length L for m=1. Based on the definition of Oppermann sequences in the first equation shown for Oppermann sequences, the sequence b is implicitly defined, although it has the form b=[1,1, . . . ,1]. Thus, the Oppermann Transform can be defined by applying the similar technique used above. The R-th sequence in the new set is written as:

$$a_R(i) = b(i)(-1)^{Ri} \exp\left(\frac{j\pi(R^m + 1)i}{L}\right)$$

for $1 \le i \le L$, and b(i) ∈ C with |b(i)|=1. Note that if b is a dual windows quasi-Barker sequence, after performing the Oppermann Transform, an orthogonal set of dual windows quasi-Barker sequences would be obtained.

Characterization of the Size of the Sequences Obtained from Oppermann Transform

Theorem 1. (Set Size of Oppermann sequences): Given m=1, the set size of Oppermann sequences can be equal to (L+1)/2 for odd L and L/2 for even L including the original sequence.

Proof. A unimodular complex sequence b(i) is used to obtain a set of Oppermann sequences, given m=1. Within this set, consider any two sequences, $a_X$ and $a_Y$:

$$a_X(i) = b(i)\exp\left(\frac{j\pi(X+1)i}{L}\right), 1 \le i \le L.$$

$$a_Y(i) = b(i)\exp\left(\frac{j\pi(Y+1)i}{L}\right), 1 \le i \le L.$$

Without loss of generality, assuming X>Y, at zero shift, the cross-correlation of these two sequences is:

$$C_{XY}(0) = \sum_{i=1}^{L} a_X(i)a_Y^*(i)$$

$$= \sum_{i=1}^{L} b(i)b^*(i)\exp\left(\frac{j\pi(X-Y)i}{L}\right)$$

$$= \sum_{i=1}^{L} \exp\left(\frac{j\pi i}{L}(X-Y)\right)$$

If (X−Y) is a non-zero even number, then $C_{XY}(0)=0$. To maximize the size of the orthogonal set of sequences, take (X−Y)=2. Hence, when L is odd, the set size is (L+1)/2; when L is even, the set size is L/2.

Theorem 2. (Size of the Sequences Set obtained from Oppermann Transform): Given m=1, the size of the sequences set obtained from Oppermann Transform is equal to L for odd L and L/2 for even L including the original sequence.

Proof. A unimodular complex sequence b(i) is used to obtain a set of sequences by applying Oppermann Transform, given m=1. Within this set, consider any two sequences, $a_X$ and $a_Y$:

$$a_X(i) = b(i)(-1)^{Xi}\exp\left(\frac{j\pi(X+1)i}{L}\right), 1 \le i \le L.$$

$$a_Y(i) = b(i)(-1)^{Yi}\exp\left(\frac{j\pi(Y+1)i}{L}\right), 1 \le i \le L.$$

Since, for any integer r, $(-1)^r=\exp(j\pi r)$, the above expressions can be written as:

$$a_X(i) = b(i)\exp\left(\frac{j\pi i(X(L+1)+1)}{L}\right), 1 \le i \le L.$$

$$a_Y(i) = b(i)\exp\left(\frac{j\pi i(Y(L+1)+1)}{L}\right), 1 \le i \le L.$$

Without loss of generality, assuming X>Y, at zero shift, the cross-correlation of these two sequences is:

$$C_{XY}(0) = \sum_{i=1}^{L} a_X(i)a_Y^*(i)$$

$$= \sum_{i=1}^{L} b(i)b^*(i)\exp\left(\frac{j\pi i}{L}(X-Y)(L+1)\right)$$

$$= \sum_{i=1}^{L} \exp\left(\frac{j\pi i}{L}(X-Y)(L+1)\right)$$

If the product (X−Y)(L+1) is a non-zero even number, then $C_{XY}(0)=0$. When L is odd, (L+1) is even, then (X−Y) can be odd or even. To maximize the set size, take (X−Y)=1. As a result, the set size is L. On the other hand, when L is even, (L+1) is odd, then (X−Y) should be even. To maximize the set size, take (X−Y)=2. As a result, the set size is L/2.

For the two aforementioned theorems, it is assumed that m=1. For prime L>2 and the original sequence is included, the size of the orthogonal sequence set (m,1,1) is given by $$\frac{L-1}{gcd(L-1,m)} + 1,$$

where gcd(L−1,m) denotes the greatest common divisor of L−1 and m. In Theorem 2, sequences set obtained from Oppermann Transform is a generalization of the original Oppermann sequence. Therefore, the size of the sequences set obtained from Oppermann Transform can also be determined by the same formula as that above.

Results and Discussion of Computer Search of Quasi-Barker Sequences

As pointed out earlier, optimizing the results of all the M correlation functions are the primary concern in the searching process. However, the first criterion for sorting out the results is to maximize the window size.

| | L | | | | | | | | | | | | | | | | | | | | |
|---|---|---|---|---|---|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 | 18 | 19 | 20 | 21 | 22 | 23 |
| W' | 1 | 1 | 2 | 2 | 3 | 3 | 3 | 4 | 5 | 5 | 6 | 6 | 4 | 7 | 5 | 8 | 7 | 6 | 7 | 10 | 7 |
| N1 (β = 2) | 1 | 2 | 1 | 7 | 1 | 4 | 2 | 16 | 1 | 4 | 1 | 22 | 6 | 1 | 1 | 10 | 1 | 12 | 1 | 2 | 3 |
| N2 (β = 1) | 1 | 0 | 1 | 0 | 1 | 0 | 2 | 0 | 1 | 0 | 1 | 0 | 6 | 0 | 1 | 0 | 1 | 0 | 1 | 0 | 3 |

| | L | | | | | | | | | | | | |
|---|---|---|---|---|---|---|---|---|---|---|---|---|---|
| | 24 | 25 | 26 | 27 | 28 | 29 | 30 | 31 | 32 | 33 | 34 | 35 | 36 |
| W' | 8 | 8 | 12 | 8 | 9 | 8 | 13 | 9 | 10 | 9 | 15 | 10 | 10 |
| N1 (β = 2) | 5 | 1 | 4 | 3 | 2 | 1 | 1 | 1 | 1 | 2 | 1 | 2 | 1 |
| N2 (β = 1) | 0 | 1 | 0 | 3 | 0 | 1 | 0 | 1 | 0 | 2 | 0 | 2 | 0 |

-continued

| | L | | | | | | | | | | | | | | |
|---|---|---|---|---|---|---|---|---|---|---|---|---|---|---|---|
| | 3 | 4 | 5 | 6 | 7 | 8 | 9 | 10 | 11 | 12 | 13 | 14 | 15 | 16 | 17 |
| W' | 1 | 1 | 2 | 2 | 3 | 3 | 3 | 4 | 5 | 5 | 6 | 6 | 7 | 7 | 7 |
| N1 ($\beta = 2$) | 1 | 2 | 1 | 1 | 1 | 1 | 1 | 1 | 1 | 2 | 1 | 1 | 1 | 1 | 1 |
| N2 ($\beta = 1$) | 1 | 0 | 1 | 0 | 1 | 0 | 1 | 0 | 1 | 0 | 1 | 0 | 1 | 0 | 1 |

Above are the number of equivalent biphase sequences with respect to $\beta=2$ and, $\beta=1$ for lengths from 3 to 36, as well as for lengths from 3 to 17. In the beginning, for a given size of the dual windows, the sequence set size is reduced by setting the constraint that the sidelobe levels of aperiodic ACF within the windows need to be smaller than a threshold $\alpha$ in Section 16. As in the aperiodic case, it is appropriate to set the $\alpha$ to be less than or equal to 2 so that the search space can be greatly reduced. Inside the sequence with $\alpha=2$, the set can be further reduced by setting $\beta$ equal to 2. In order to further enhance the performance of the sequences found, set $\beta=1$ such that the resulting sequences satisfy quasi-Barker condition within the dual windows.

The number of inequivalent biphase sequences satisfying the threshold of $\beta=2$ and $\beta=1$ are listed in the table above as N1 and N2 respectively and W'denotes the maximum size of windows that can be attained. The results of number of inequivalent quadriphase sequences are listed in the table above. It is observed that when tightening the constraint from $\beta=2$ to $\beta=1$, the number of inequivalent sequences of odd-length (both biphase and quadriphase) can remain the same and more, the sidelobe levels within windows of the sequences are still maintained to be less than or equal to one. But this is not true for sequences of even-length. The major reason of this is due to the sidelobe level of the shift next to the mainlobe is equal to 0 for odd-length sequences in the aperiodic ACF while it is equal to one for even-length sequences. This makes substantially all sidelobe levels with windows for odd-length sequences can maintain as one in the correlation functions.

Figure 3:
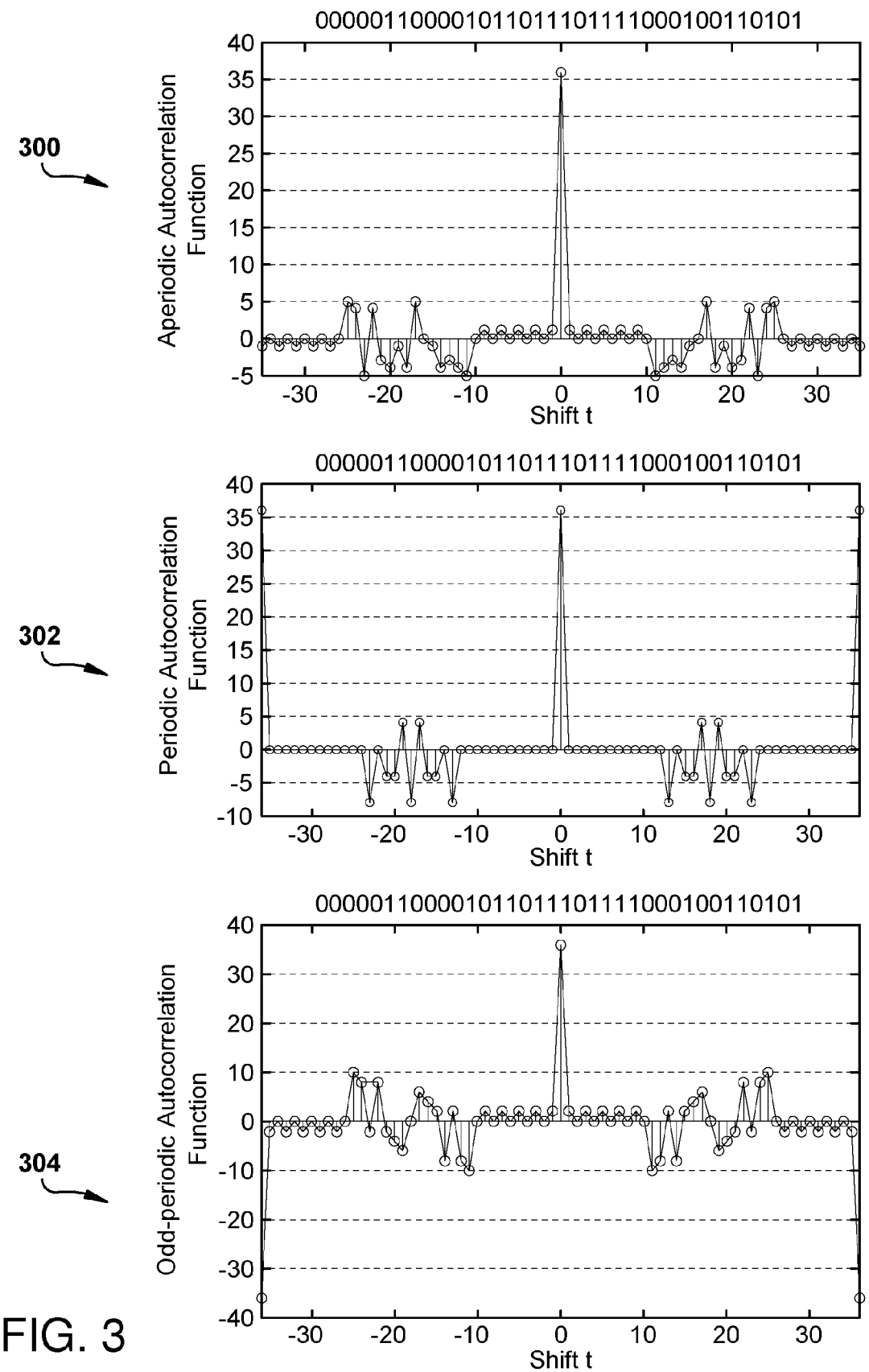
FIGS. 3-5 illustrate exemplary graphs showing sums for aperiodic, periodic, and odd-period autocorrelation functions at various sequence lengths and window sizes.
Figure 4:
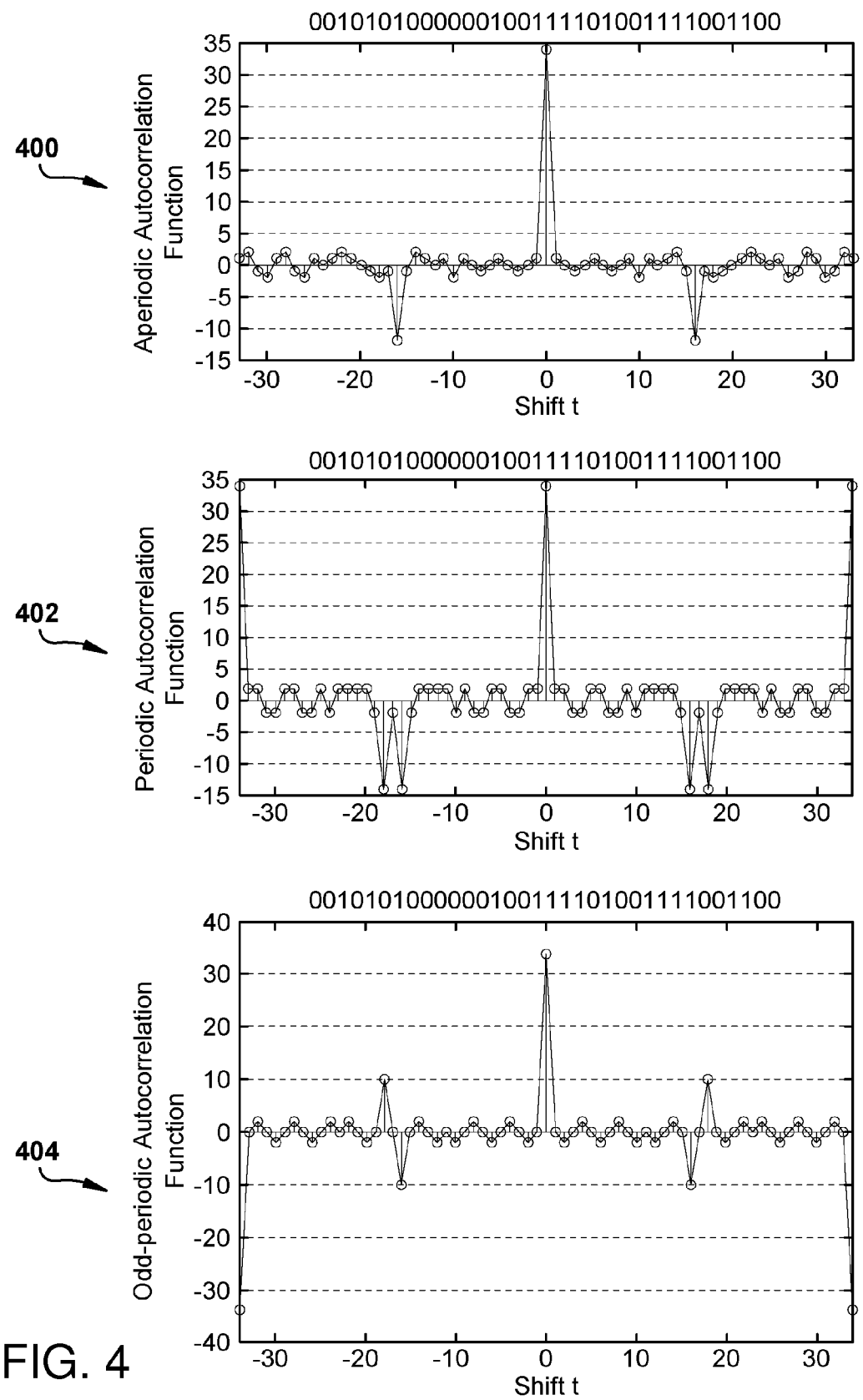
Figure 5:
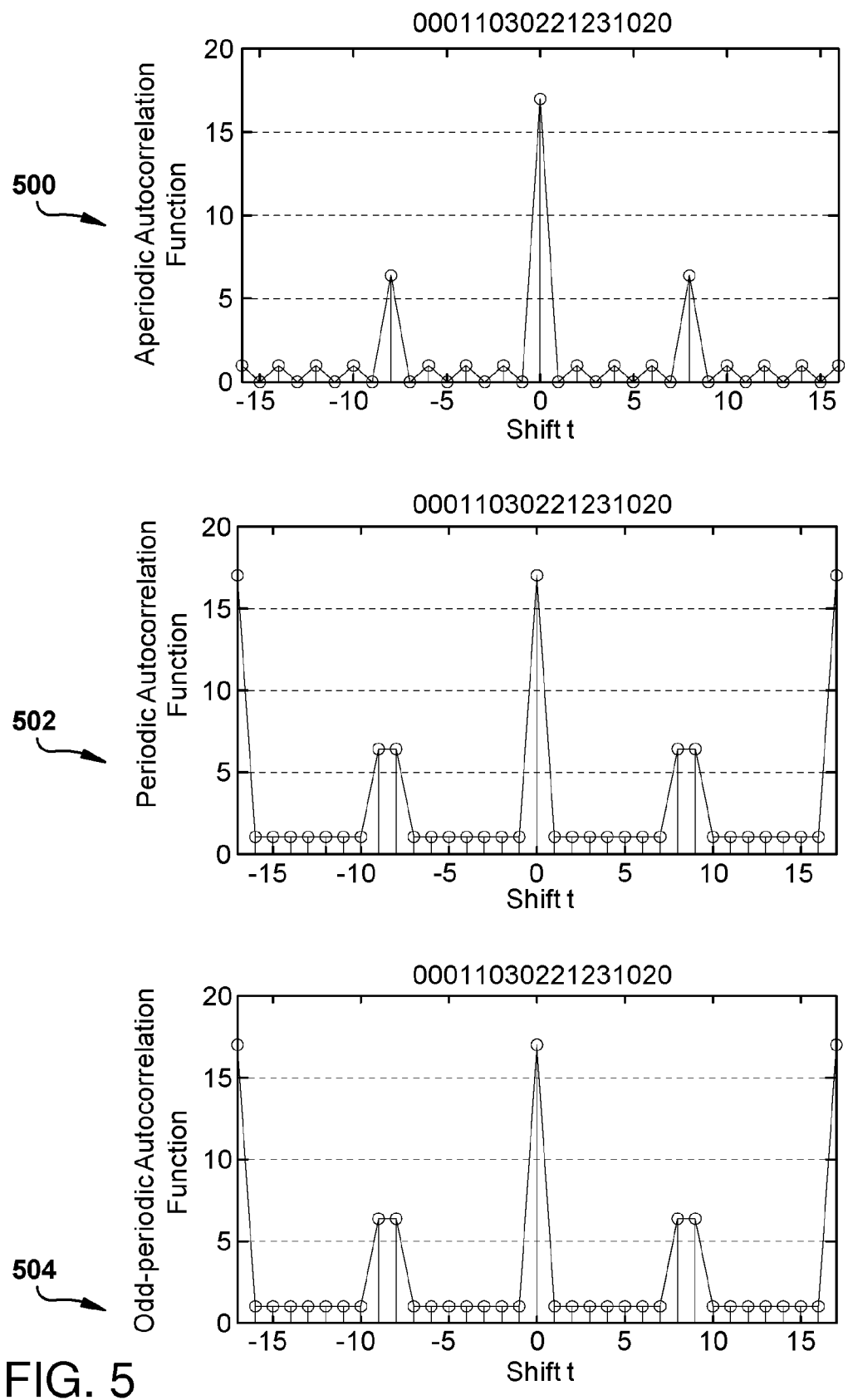

In the results, the signal energies of all the correlation functions are minimized within windows. The below tables list the parameters of all the best biphase and quadriphase optimal sequences of lengths up to 36 and 17 respectively with minimum signal energies within windows. The window size W' is maximized to tolerate the existence of two windows for sequences of every length. It is shown that the maximum possible size of windows is equal to $\lfloor (L-1)/2 \rfloor$, where $\lfloor x \rfloor$ is the integral part of x. The list of the sample optimal quasi-Barker sequences with maximum window size W' and minimum out-of-the-window peak sidelobe levels of all the correlation functions are also tabulated in the below tables. The aperiodic autocorrelation function, period correlation function, and the odd-periodic correlation function of the best biphase sequences of length 36 and window size 10 are shown in FIG. 3 at 300, 302, and 304, respectively. The aperiodic autocorrelation function, period correlation function, and the odd-periodic correlation function of the best biphase sequences of length 34 and window size 15 are shown in FIG. 4 at 400, 402, and 404, respectively. The aperiodic autocorrelation function, period correlation function, and the odd-periodic correlation function of the best biphase sequences of length 17 and window size 7 are shown in FIG. 5 at 500, 502, and 504, respectively.

After all the elimination procedures in the searching process, by making use of the optimal sequences of dual windows in below tables, the resulting combined set of sequences are practically optimal and useful to QS-CDMA systems by achieving certain degree of quasi-synchronism for BPSK and QPSK modulation during data transmission respectively. It is to be appreciated that a single sequence with dual low auto-correlation windows can also be used in the "degenerated" case of a single-user QS-CDMA system, conventionally called the quasi-synchronous spread spectrum system.

| L | W' | N1 | N2 | S1 | S2 | S3 | S4 | P1 | P2 | P3 | P4 | SAMPLE INDEX SEQUENCES |
|---|----|----|----|----|----|----|----|----|----|----|----|------------------------|
| 3 | 1 | 1 | 1 | 2 | 2 | 2 | 2 | 1 | 1 | 1 | 1 | 001 |
| 4 | 1 | 2 | 0 | 0 | 8 | 4 | 4 | 0 | 0 | 0 | 0 | 0001 |
| 5 | 2 | 1 | 1 | 4 | 4 | 4 | 4 | 1 | 1 | 1 | 1 | 00010 |
| 6 | 2 | 7 | 0 | 16 | 8 | 12 | 12 | 2 | 0 | $\sqrt{2}$ | $\sqrt{2}$ | 000010 |
| 7 | 3 | 1 | 1 | 6 | 6 | 6 | 6 | 1 | 1 | 1 | 1 | 0001101 |
| 8 | 3 | 4 | 0 | 0 | 16 | 8 | 8 | 4 | 2 | $\sqrt{8}$ | $\sqrt{8}$ | 00001101 |
| 9 | 3 | 2 | 2 | 6 | 6 | 6 | 6 | 3 | 3 | 3 | 3 | 000011010 |
| 10 | 4 | 16 | 0 | 32 | 16 | 24 | 24 | 2 | 0 | $\sqrt{2}$ | $\sqrt{2}$ | 0000011010 |
| 11 | 5 | 1 | 1 | 10 | 10 | 10 | 10 | 1 | 1 | 1 | 1 | 00011101101 |
| 12 | 5 | 4 | 0 | 0 | 24 | 12 | 12 | 4 | 2 | $\sqrt{8}$ | $\sqrt{8}$ | 000001100101 |
| 13 | 6 | 1 | 1 | 12 | 12 | 12 | 12 | 1 | 1 | 1 | 1 | 0000011001010 |
| 14 | 6 | 2 | 0 | 48 | 24 | 36 | 36 | 2 | 0 | $\sqrt{2}$ | $\sqrt{2}$ | 000000011001010 |
| 15 | 4 | 6 | 6 | 8 | 8 | 8 | 8 | 7 | 1 | 5 | 5 | 000011000100101 |
| 16 | 7 | 1 | 0 | 0 | 32 | 16 | 16 | 12 | 2 | $\sqrt{72}$ | $\sqrt{72}$ | 0000011010111001 |
| 17 | 5 | 1 | 1 | 10 | 10 | 10 | 10 | 7 | 7 | 7 | 7 | 00000110111001010 |
| 18 | 8 | 10 | 0 | 64 | 32 | 48 | 48 | 2 | 0 | 2 | 2 | 000001011010001100 |
| 19 | 7 | 1 | 1 | 14 | 14 | 14 | 14 | 5 | 5 | 5 | 5 | 0000011100110110101 |
| 20 | 6 | 12 | 0 | 0 | 24 | 12 | 12 | 8 | 4 | $\sqrt{32}$ | $\sqrt{32}$ | 00000110010000110101 |
| 21 | 7 | 1 | 1 | 14 | 14 | 14 | 14 | 5 | 5 | 5 | 5 | 000111010001000010010 |
| 22 | 10 | 2 | 0 | 80 | 40 | 60 | 60 | 6 | 0 | $\sqrt{18}$ | $\sqrt{18}$ | 0000010101001001100011 |
| 23 | 7 | 3 | 3 | 14 | 14 | 14 | 14 | 5 | 5 | 5 | 5 | 00000110110111000110101 |
| 24 | 8 | 5 | 0 | 0 | 32 | 16 | 16 | 8 | 2 | $\sqrt{34}$ | $\sqrt{34}$ | 000000110010101110010110 |
| 25 | 8 | 1 | 1 | 16 | 16 | 16 | 16 | 7 | 9 | $\sqrt{45}$ | $\sqrt{45}$ | 0001110101111101100010010 |
| 26 | 12 | 4 | 0 | 96 | 48 | 72 | 72 | 22 | 0 | $\sqrt{242}$ | $\sqrt{242}$ | 00000011001010111110011010 |

-continued

| L | W' | N1 | N2 | S1 | S2 | S3 | S4 | P1 | P2 | P3 | P4 | SAMPLE INDEX SEQUENCES |
|---|----|----|----|----|----|----|----|----|----|----|----|----|
| 27 | 8 | 3 | 3 | 16 | 16 | 16 | 16 | 5 | 5 | 5 | 5 | 000001110100110011110110101 |
| 28 | 9 | 2 | 0 | 0 | 40 | 20 | 20 | 8 | 10 | $\sqrt{50}$ | $\sqrt{50}$ | 0000001100101000011101100101 |
| 29 | 8 | 1 | 1 | 16 | 16 | 16 | 16 | 7 | 7 | 7 | 7 | 00011100101011101111110010010 |
| 30 | 13 | 2 | 0 | 104 | 48 | 76 | 76 | 6 | 2 | $\sqrt{20}$ | $\sqrt{20}$ | 000001111011011010101011001110 |
| 31 | 9 | 1 | 1 | 18 | 18 | 18 | 18 | 9 | 13 | $\sqrt{125}$ | $\sqrt{125}$ | 0000011001010000111101100110101 |
| 32 | 10 | 1 | 0 | 0 | 40 | 20 | 20 | 12 | 10 | $\sqrt{72}$ | $\sqrt{72}$ | 00000001110001010010011011100101 |
| 33 | 9 | 2 | 2 | 18 | 18 | 18 | 18 | 7 | 7 | 7 | 7 | 000000011011001011110011100101010 |
| 34 | 15 | 1 | 0 | 120 | 56 | 88 | 88 | 14 | 10 | $\sqrt{148}$ | $\sqrt{148}$ | 0010101000000100111101001111001100 |
| 35 | 10 | 2 | 2 | 20 | 20 | 20 | 20 | 21 | 21 | 21 | 21 | 00011101101011000100100000011101101 |
| 36 | 10 | 1 | 0 | 0 | 40 | 20 | 20 | 8 | 10 | $\sqrt{34}$ | $\sqrt{34}$ | 000001100001011011101111000100110101 |

L: sequence length
W': window size
N1: Number of total inequivalent sequence(s) satisfying β = 2
N2: Number of total inequivalent sequence(s) satisfying β = 1
S1: total sidelobe signal energy for PACF within windows
S2: total sidelobe signal energy for OACF within windows
S3: total sidelobe signal energy for PACF with conjugation within windows
S4: total sidelobe signal energy for OACF with conjugation within windows
P1: minimum out-of-window PSL of periodic autocorrelation functions (PACF)
P2: minimum out-of-window PSL of odd-periodic autocorrelation functions (OACF)
P3: minimum out-of-window PSL of periodic autocorrelation functions with conjugation
P4: minimum out-of-window PSL of odd-periodic autocorrelation functions with conjugation

| L | W' | N1 | N2 | S1 | S2 | S3 | S4 | P1 | P2 | P3 | P4 | SAMPLE INDEX SEQUENCES |
|---|----|----|----|----|----|----|----|----|----|----|----|----|
| 3 | 1 | 1 | 1 | 2 | 2 | 2 | 2 | 1 | 1 | 1 | 1 | 002 |
| 4 | 1 | 2 | 0 | 0 | 4 | 4 | 4 | 0 | 0 | 0 | 0 | 0002 |
| 5 | 2 | 1 | 1 | 4 | 4 | 4 | 4 | 1 | 1 | 1 | 1 | 00020 |
| 6 | 2 | 1 | 0 | 0 | 8 | 4 | 4 | $\sqrt{20}$ | 0 | $\sqrt{10}$ | $\sqrt{10}$ | 001002 |
| 7 | 3 | 1 | 1 | 6 | 6 | 6 | 6 | 1 | 1 | 1 | 1 | 0002202 |
| 8 | 3 | 1 | 0 | 0 | 16 | 8 | 8 | $\sqrt{8}$ | 0 | 2 | 2 | 00103120 |
| 9 | 3 | 1 | 1 | 6 | 6 | 6 | 6 | 3 | 3 | 3 | 3 | 000022020 |
| 10 | 4 | 1 | 0 | 8 | 8 | 8 | 8 | $\sqrt{68}$ | 0 | $\sqrt{24}$ | $\sqrt{24}$ | 0001321231 |
| 11 | 5 | 1 | 1 | 10 | 10 | 10 | 10 | 1 | 1 | 1 | 1 | 00022202202 |
| 12 | 5 | 2 | 0 | 0 | 24 | 12 | 12 | 4 | 2 | $\sqrt{8}$ | $\sqrt{8}$ | 000002200202 |
| 13 | 6 | 1 | 1 | 12 | 12 | 12 | 12 | 1 | 1 | 1 | 1 | 0000022002020 |
| 14 | 5 | 1 | 0 | 24 | 16 | 16 | 16 | 10 | 0 | $\sqrt{50}$ | $\sqrt{50}$ | 00002201212031 |
| 15 | 7 | 1 | 1 | 14 | 14 | 14 | 14 | 1 | 1 | 1 | 1 | 000110331231020 |
| 16 | 7 | 1 | 0 | 0 | 32 | 16 | 16 | 12 | 0 | $\sqrt{72}$ | $\sqrt{72}$ | 0000022020222002 |
| 17 | 7 | 1 | 1 | 14 | 14 | 14 | 14 | $\sqrt{41}$ | $\sqrt{41}$ | $\sqrt{41}$ | $\sqrt{41}$ | 00011030221231020 |

L: sequence length
W': window size
N1: Number of total inequivalent sequence(s) satisfying β = 2
N2: Number of total inequivalent sequence(s) satisfying β = 1
S1: total sidelobe signal energy for PACF within windows
S2: total sidelobe signal energy for OACF within windows
S3: total sidelobe signal energy for PACF with conjugation within windows
S4: total sidelobe signal energy for OACF with conjugation within windows
P1: minimum out-of-window PSL of periodic autocorrelation functions (PACF)
P2: minimum out-of-window PSL of odd-periodic autocorrelation functions (OACF)
P3: minimum out-of-window PSL of periodic autocorrelation functions with conjugation
P4: minimum out-of-window PSL of odd-periodic autocorrelation functions with conjugation

EXAMPLE EMBODIMENTS AND ENVIRONMENTS

Figure 6:
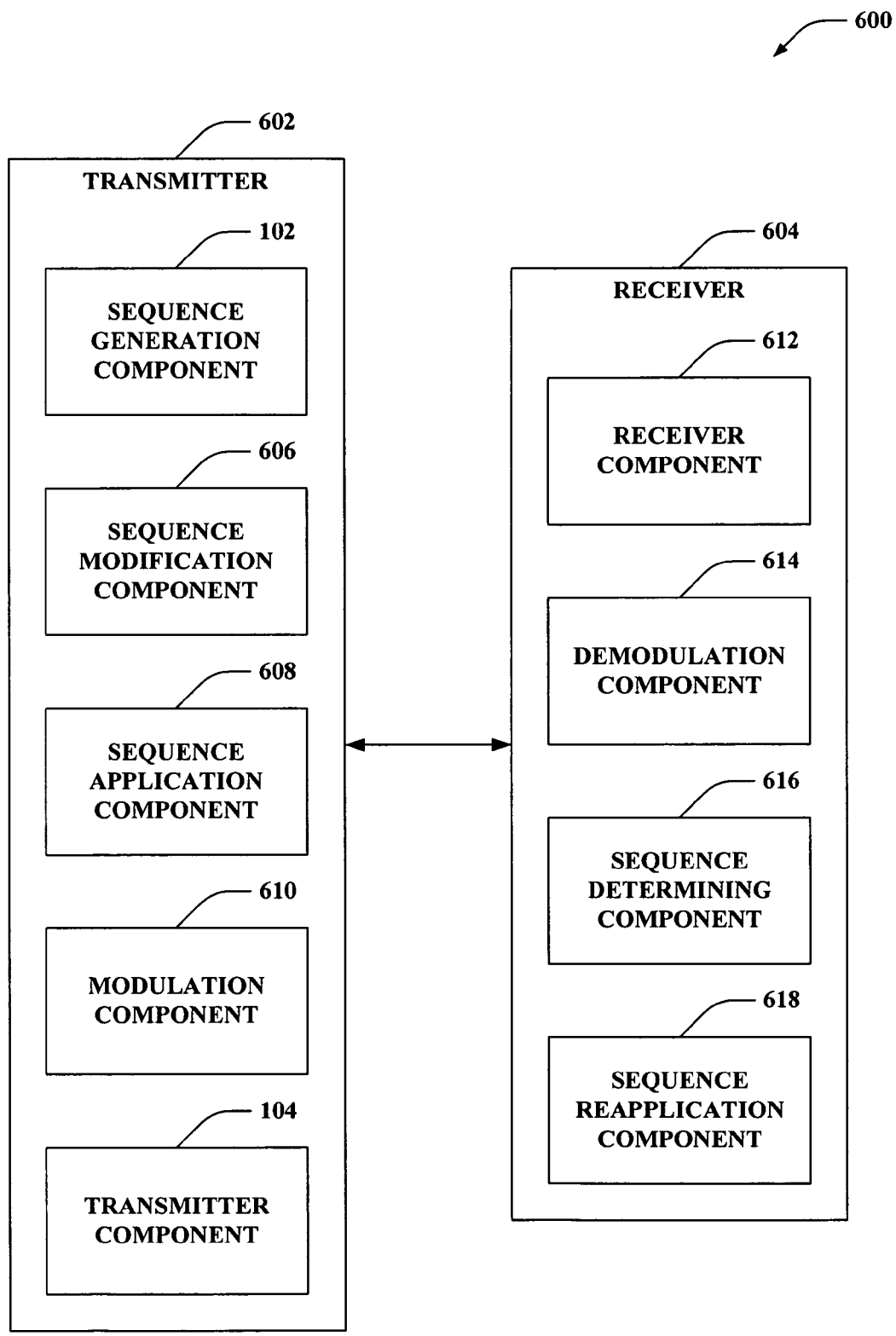
FIG. 6 illustrates a high-level block diagram of an example system that can apply sequences to and transmit data in a network.

Referring to FIG. 6, an example system 600 for transmitting sequence applied signals in a network is illustrated. The system 600 comprises a transmitter 602 that communicates signals to a receiver 604. The transmitter 602 comprises a sequence generation component 102 that can generate one or more sequences described herein to utilize in communicating with the receiver 604, a sequence modification component 606 that can alter sequence by the Oppermann transform to achieve a set of orthogonal sequences, a sequence application component 608 that can spread data over a signal based on a sequence, a modulation component 610 that can modulate signals into a mixed signal for subsequent transmission, and a transmitter component 104 that transmits mixed signals over a network. The receiver 604 comprises a receiver component 612 that can receive signals in a network (e.g., from the transmitter 602), a demodulation component 614 that can demodulate mixed signals to produce one or more sequenced signals, a sequence determining component 616 that can detect a sequence applied to received signals, and a sequence reapplication component 618 that can reapply a sequence to a signal to obtain data transmitted in the signal. It is to be appreciated that the transmitter 602 can also be a receiver comprising one or more components of the receiver 604 and vice versa, in one example—the components are excluded for ease of explanation.

According to an example, the transmitter 602 can produce data to convey to the receiver 604 and/or one or more disparate receivers in a network, which can communicate over a wired and/or wireless network. The sequence generation component 102 can create one or more dual window sequences (e.g., quasi-Barker sequences) described herein for subsequent transmission of the data. It is to be appreciated that the sequence generation component 102 can generate a number of sequences based on a desired sequence size, number of orthogonal sequences desired, etc. The sequence modification component 606 can, in one example, modify the dual window sequence by the Oppermann transform, described supra, to extract an orthogonal set of sequences to be utilized. It is to be appreciated that in a single-user quasi-synchronous spread spectrum communication system, which can be viewed as the special case of a QS-CDMA system, the sequence modification component 606 need not apply the Oppermann transform to the orthogonal sequences. The Oppermann transform need not be applied, for example, because only one user or device is active in the single-user quasi-synchronous spread spectrum communication system such that there is no inter-user interference, and a single dual low correlation window sequence can be applied, as described herein.

The sequence application component 608 can spread the data over a signal using one or more of the orthogonal sequences. The modulation component 610 can subsequently modulate the signal, and the transmitter component 104 can transmit the signal over the network. It is to be appreciated that one or more of the sequences can additionally or alternatively be hardcoded within the transmitter 602. In this regard, orthogonal transmission of signals using dual window sequences, which can have at least partial Barker properties, is achieved.

Receiving component 612 of the receiver 604 can obtain the signal via an antenna, wire, or other receiving medium. The demodulation component 614 can demodulate the signal and one or more other mixed signals into one or more sequence applied signals related to various devices. The sequence determining component 616 can discern a sequence applied to the signal, which can be a dual window sequence, such as a quasi-Barker sequence, as described. The sequence determining component 616 can detect the sequence based on one or more factors related to the received signal, an indication of the sequence utilized, a network protocol, and/or the like. Upon detecting the sequence, the sequence reapplication component 618 can apply the sequence to the signal to retrieve transmitted data.

Figure 7:
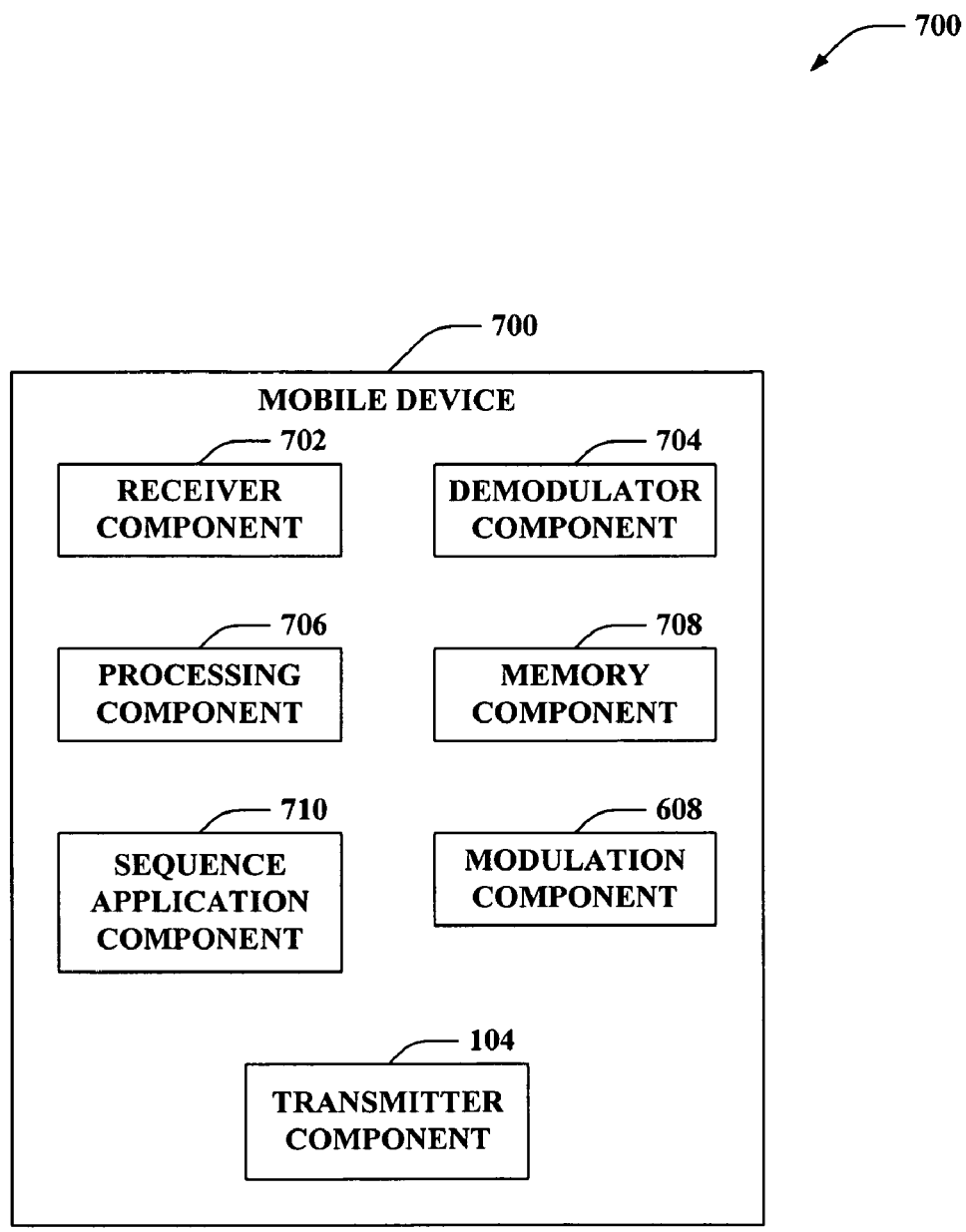
FIG. 7 illustrates a high-level block diagram of an example mobile device that can apply sequences to data for transmission thereof.

Turning now to FIG. 7, an example mobile device 700 is illustrated that facilitates transmitting signals in a wireless network by utilizing dual window sequences as described. The mobile device 700 can comprise a receiver component 702 that can receive signals transmitted over a wireless network, a demodulator component 704 that can demodulate the signals into data transmitted by the signal, a processing component 706 upon which one or more components can be executed to facilitate transmitting and receiving signals, rendering data in the signals, or substantially any other functionality of the mobile device 700, a memory component 708 that can store data related to the signals, sequences, and/or substantially any other functionality of the mobile device 700, a sequence application component 710 that spread data over a signal using one or more dual window sequences (e.g., quasi-Barker sequences) as described herein, a modulation component 608 that can modulate the mixed signal, and a transmitter component 104 that can transmit the signal over a wireless network. The mobile device 700 can be substantially any device that can communicate over a wireless network, such as (but not limited to) a mobile cellular phone, Smartphone, computer, laptop, server, Bluetooth and/or WiFi enabled device, tethered processor and/or memory devices such as a modem, and/or the like.

According to an example, the receiver 702 can receive signals transmitted from a device in a wireless network, such as a base station (not shown) or other mobile device. The signal can relate to receiving wireless network access from the base station, in one example. The demodulator component 704 can demodulate the signal to determine data transmitted by the signal. The processing component 706 can interpret the data and/or provide the data to one or more applications executing on the processing component 706. In one example, an application can utilize the processing component 706 to communicate with a device that transmitted the signal and/or one or more disparate devices. The processing component 706 can receive data to be transmitted and provide the data to the sequence application component 710.

The sequence application component 710 can determine a modulation sequence to apply to the data. In one example, the sequence application component 710 can acquire such a sequence from the memory component 708, which can store such sequences among other data. In another example, the sequence application component 710 can be hardcoded with usable sequences. The sequences, as described, can be the dual window sequences described herein, such as the quasi-Barker sequences, Oppermann transform applied sequences, and/or the like. The sequence application component 710 can spread data over a signal using one or more of the sequences, and the modulation component 608 can modulate the mixed signal. Subsequently, the transmitter component 104 can transmit the signal to one or more network devices, such as the base station.

Figure 8:
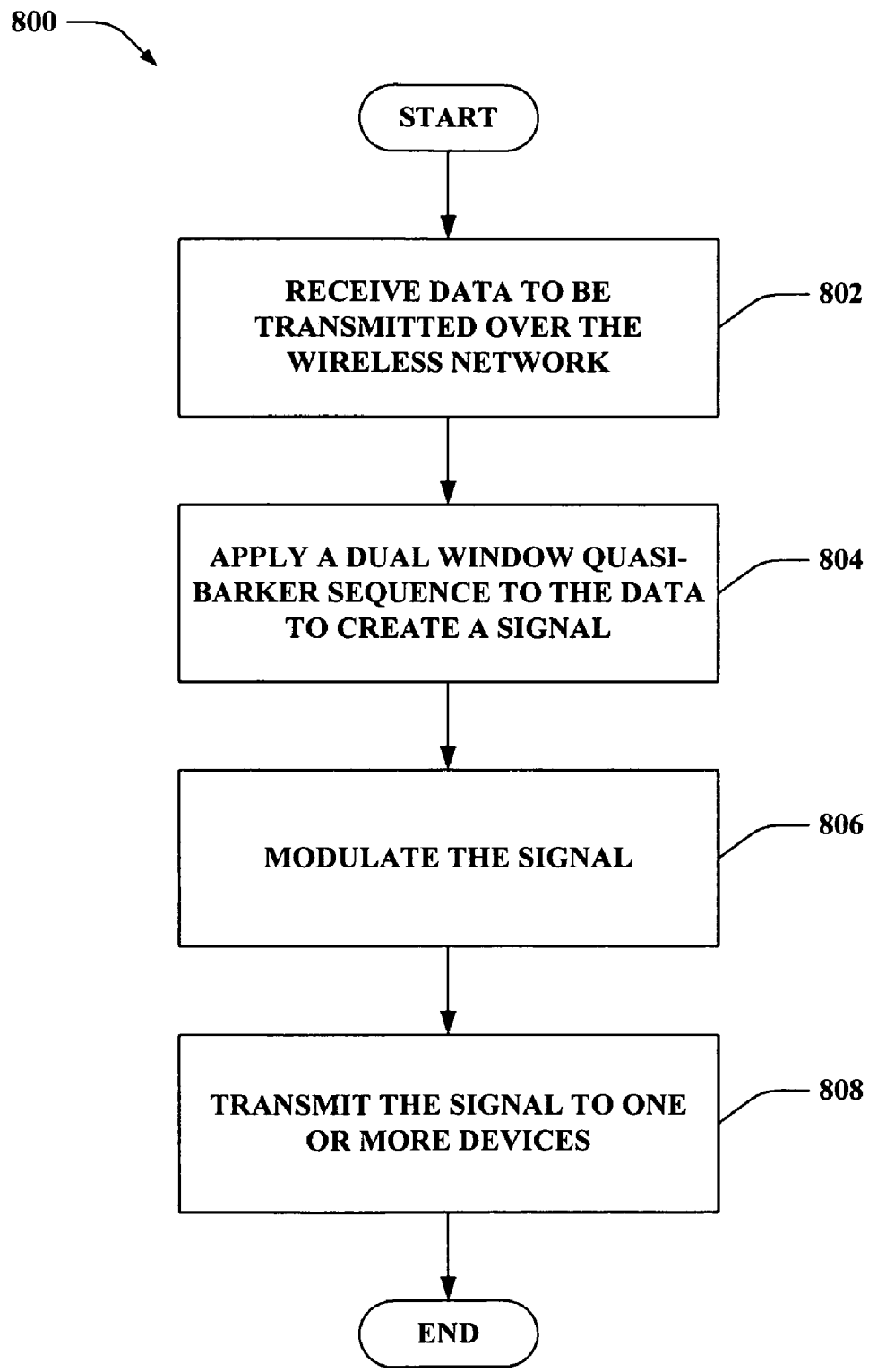
FIG. 8 illustrates an exemplary flow chart that applies sequences for transmitting data over a wireless network.

Referring now to FIG. 8, an example methodology that can be implemented in accordance with various aspects described herein is illustrated. While, for purposes of simplicity of explanation, the methodology is shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology in accordance with the claimed subject matter.

Furthermore, the claimed subject matter may be described in the general context of computer-executable instructions, such as program modules, executed by one or more components. Generally, program modules include routines, programs, objects, data structures, etc., that perform particular tasks or implement particular abstract data types. Typically the functionality of the program modules may be combined or distributed as desired in various embodiments. Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Referring to FIG. 8, an example methodology 800 that facilitates applying dual window quasi-Barker sequences to data for transmission over wireless networks is displayed. At 802, data to be transmitted over the wireless network can be received. At 804, one or more dual window quasi-Barker sequences can be applied to the data. At 806, the signal can be modulated to create a portion of a mixed signal, and at 808, the signal having the applied dual window quasi-Barker sequence, can be transmitted to one or more devices.

Figure 9:
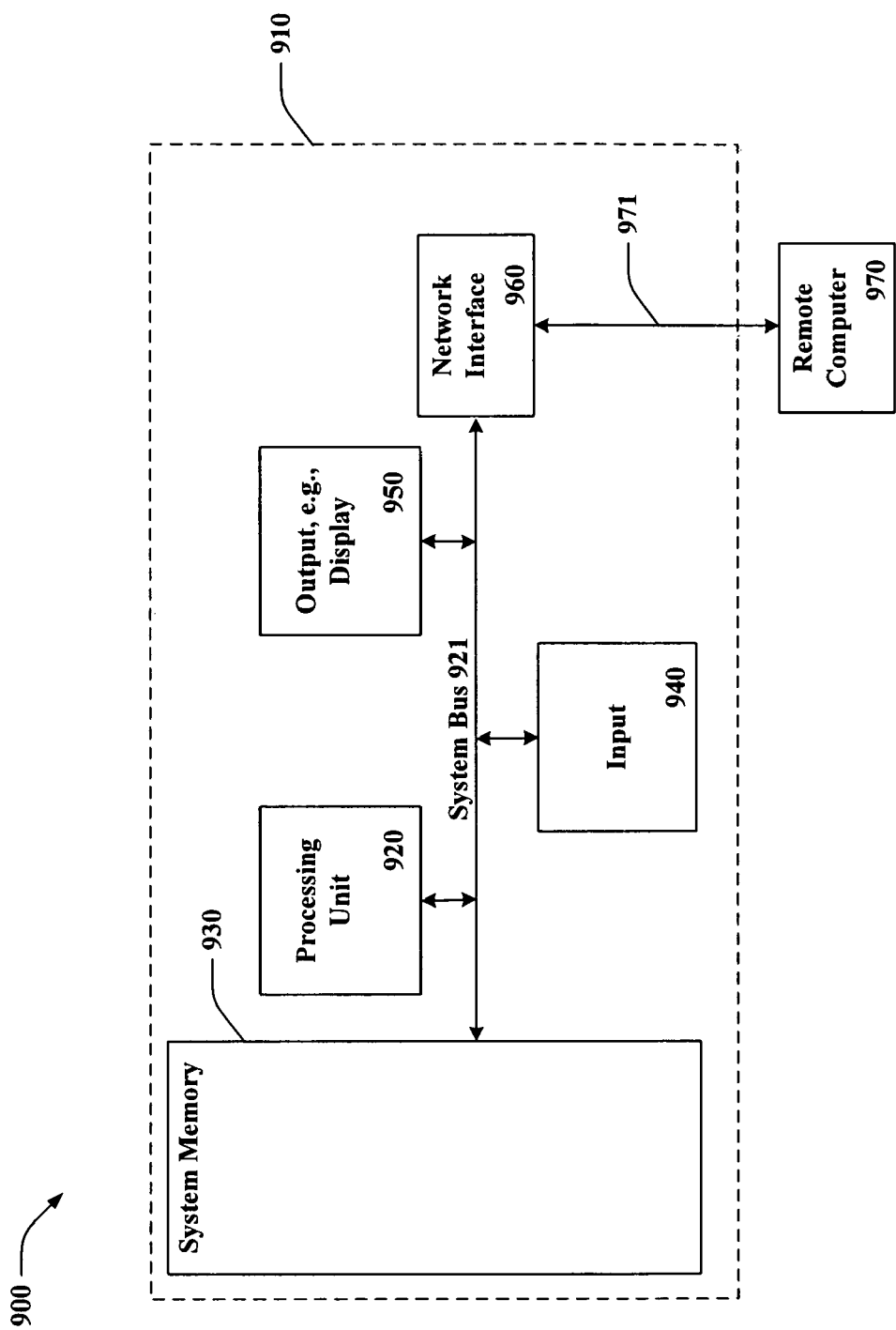
FIG. 9 illustrates a block diagram of an example operating environment in which various aspects described herein can function.

Turning to FIG. 9, an exemplary non-limiting computing system or operating environment in which various aspects described herein can be implemented is illustrated. One of ordinary skill in the art can appreciate that handheld, portable and other computing devices and computing objects of all kinds are contemplated for use in connection with the claimed subject matter, e.g., anywhere that a communications system may be desirably configured. Accordingly, the below general purpose remote computer described below is but one example of a computing system in which the claimed subject matter can be implemented.

Although not required, the claimed subject matter can partly be implemented via an operating system, for use by a developer of services for a device or object, and/or included within application software that operates in connection with one or more components of the claimed subject matter. Software may be described in the general context of computer executable instructions, such as program modules, being executed by one or more computers, such as client workstations, servers or other devices. Those skilled in the art will appreciate that the claimed subject matter can also be practiced with other computer system configurations and protocols.

FIG. 9 thus illustrates an example of a suitable computing system environment 900 in which the claimed subject matter can be implemented, although as made clear above, the computing system environment 900 is only one example of a suitable computing environment for a media device and is not intended to suggest any limitation as to the scope of use or functionality of the claimed subject matter. Further, the computing environment 900 is not intended to suggest any dependency or requirement relating to the claimed subject matter and any one or combination of components illustrated in the example operating environment 900.

With reference to FIG. 9, an example of a remote device for implementing various aspects described herein includes a general purpose computing device in the form of a computer 910. Components of computer 910 can include, but are not limited to, a processing unit 920, a system memory 930, and a system bus 921 that couples various system components including the system memory 930 to the processing unit 920. The system bus 921 can be any of several types of bus structures including a memory bus or memory controller, a peripheral bus, and a local bus using any of a variety of bus architectures.

Computer 910 can include a variety of computer readable media. Computer readable media can be any available media that can be accessed by computer 910. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media can embody computer readable instructions, data structures, program modules or other data in a modulated data signal such as a carrier wave or other transport mechanism and can include any suitable information delivery media.

The system memory 930 can include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, can be stored in memory 930. Memory 930 can also contain data and/or program modules that are immediately accessible to and/or presently being operated on by processing unit 920. By way of non-limiting example, memory 930 can also include an operating system, application programs, other program modules, and program data.

The computer 910 can also include other removable/non-removable, volatile/nonvolatile computer storage media. For example, computer 910 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 921 through a non-removable memory interface such as an interface, and a magnetic disk drive or optical disk drive can be connected to the system bus 921 by a removable memory interface, such as an interface.

A user can enter commands and information into the computer 910 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 920 through user input 940 and associated interface(s) that are coupled to the system bus 921, but can be connected by other interface and bus structures, such as a parallel port, game port or a universal serial bus (USB). A graphics subsystem can also be connected to the system bus 921. In addition, a monitor or other type of display device can be connected to the system bus 921 via an interface, such as output interface 950, which can in turn communicate with video memory. In addition to a monitor, computers can also include other peripheral output devices, such as speakers and/or a printer, which can also be connected through output interface 950.

The computer 910 can operate in a networked or distributed environment using logical connections to one or more other remote computers, such as remote computer 970, which can in turn have media capabilities different from device 910. The remote computer 970 can be a personal computer, a server, a router, a network PC, a peer device or other common network node, and/or any other remote media consumption or transmission device, and can include any or all of the elements described above relative to the computer 910. The logical connections depicted in FIG. 9 include a network 971, such local area network (LAN) or a wide area network (WAN), but can also include other networks/buses. Such networking environments are commonplace in homes, offices, enterprise-wide computer networks, intranets and the Internet.

When used in a LAN networking environment, the computer 910 is connected to the LAN 971 through a network interface or adapter 960. When used in a WAN networking environment, the computer 910 can include a communications component, such as a modem, or other means for establishing communications over the WAN, such as the Internet. A communications component, such as a modem, which can be internal or external, can be connected to the system bus 921 via the user input interface at input 940 and/or other appropriate mechanism. In a networked environment, program modules depicted relative to the computer 910, or portions thereof, can be stored in a remote memory storage device. It should be appreciated that the network connections shown and described are exemplary and other means of establishing a communications link between the computers can be used.

Figure 10:
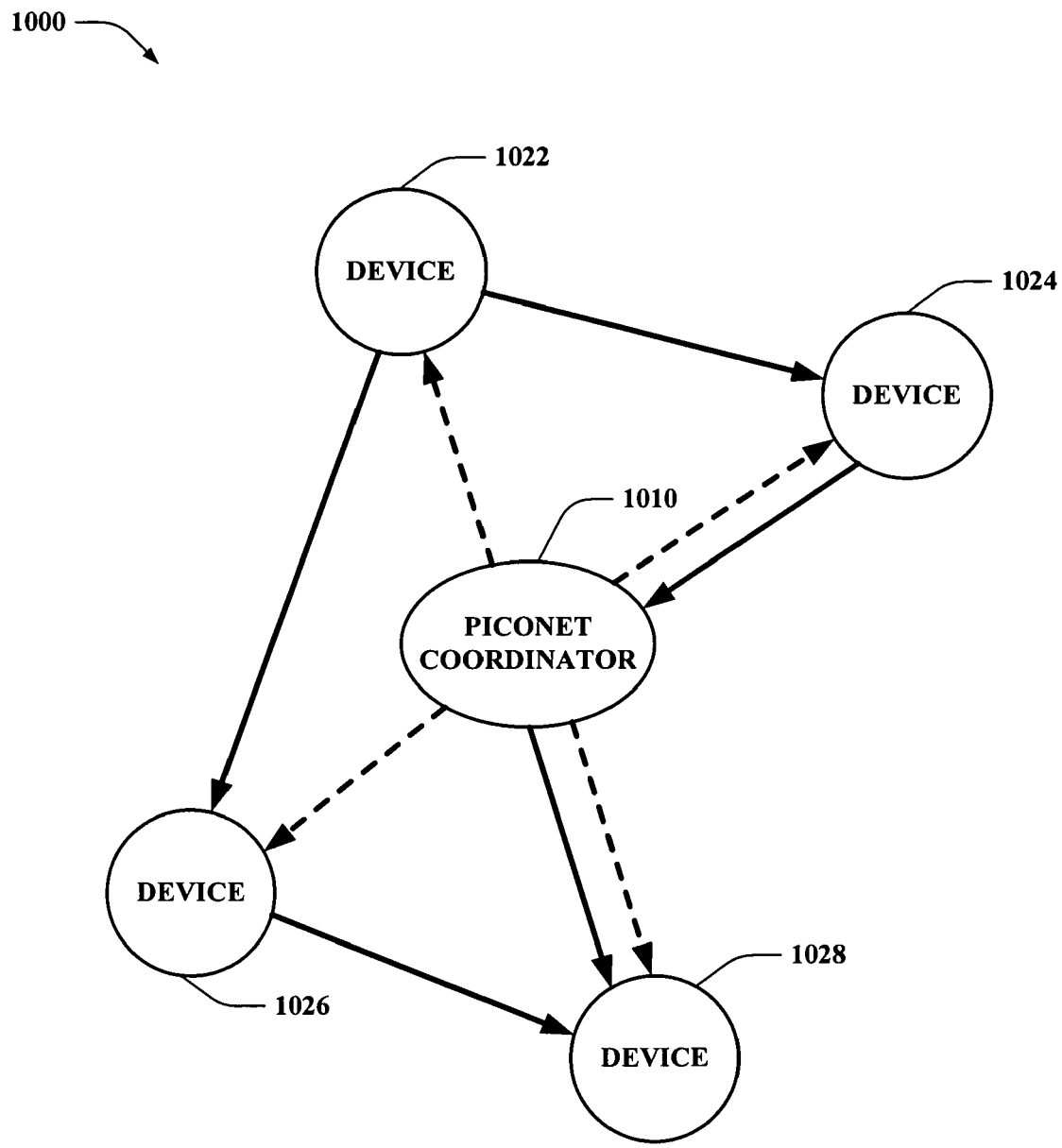
FIG. 10 illustrates an example wireless communication network in which various aspects described herein can be utilized.
Figure 11:
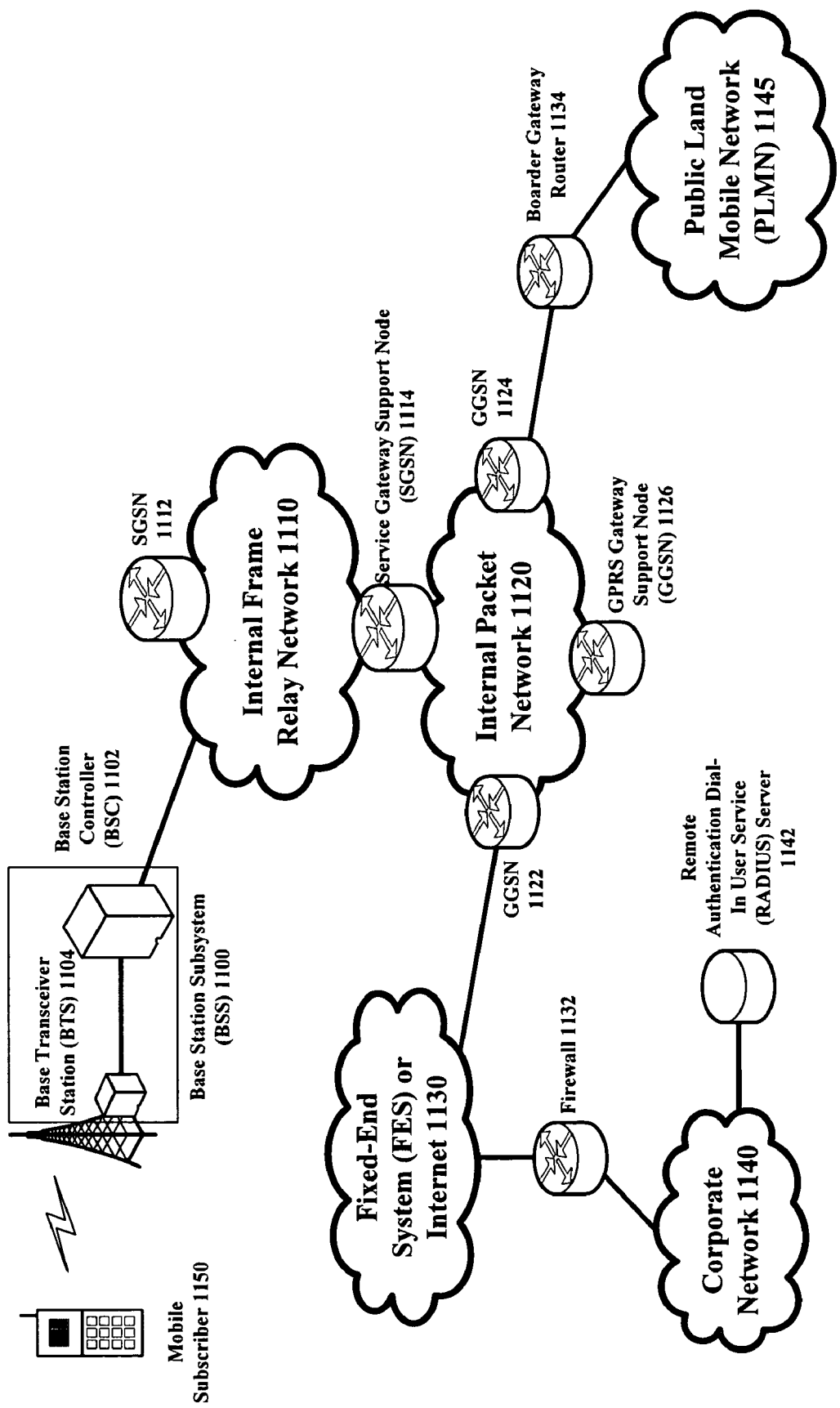
FIG. 11 illustrates an overview of a wireless network environment suitable for service by various aspects described herein.

Turning now to FIGS. 10-11, an overview of network environments in which the claimed subject matter can be implemented is illustrated. The above-described systems and methodologies can be applied to any wireless communication network; however, the following description sets forth some exemplary, non-limiting operating environments for said systems and methodologies. The below-described operating environments should be considered non-exhaustive, and thus the below-described network architectures are merely examples of network architectures into which the claimed subject matter can be incorporated. It is to be appreciated that the claimed subject matter can be incorporated into any now existing or future alternative communication network architectures as well.

Referring first to FIG. 10, a wireless personal area network (WPAN) architecture 1000 based on the IEEE 1002.15.3 high data rate WPAN standard is illustrated. Based on the IEEE 1002.15.3 standard, the WPAN architecture 1000 can include one or more piconets. As used herein, a piconet is an ad hoc network of independent data devices 1010-1028 that can engage in peer-to-peer communication. FIG. 10 illustrates one such piconet. In one example, the range of a piconet is confined to a personal area of, for example, 10 to 50 meters, although a piconet can alternatively provide coverage for a larger or smaller coverage area.

In accordance with one aspect, a piconet can be established by a device 1010 that is capable of becoming a piconet coordinator (PNC). The device 1010 can establish the piconet by scanning a set of available communication channels (e.g., communication channels corresponding to time frequency codes in an MB-OFDM communication environment) for a channel having a least amount of interference that is not in use by neighboring piconets. Once such a communication channel is found, the device 1010 can become a PNC and begin transmitting control messaging in the form of beacons to allow other devices 1022-1028 to connect to the piconet. As illustrated in architecture 1000, beacons transmitted by PNC 1010 are shown by dotted lines.

Once a PNC 1010 establishes a piconet, one or more devices 1022-1028 can associate with the PNC 1010 based on beacons transmitted by the PNC 1010. In one example, beacons provided by a PNC 1010 can provide timing information, and a device 1022-1028 can perform one or more timing synchronization techniques based on received beacons as described supra while associating with the piconet coordinated by the PNC 1010. In addition, beacons transmitted by the PNC 1010 can also contain information relating to quality of service (QoS) parameters, time slots for transmission by devices 1022-1028 in the piconet, and/or other suitable information. After a device 1022-1028 has successfully associated with the piconet, it can then communicate in the piconet by transmitting data to the PNC 1010 and/or one or more other devices 1022-1028 in the piconet. As illustrated in architecture 1000, data transmissions are indicated by solid lines.

In accordance with one aspect, the PNC 1010 and devices 1022-1028 can additionally communicate using ultra-wideband (UWB) communication. When UWB is used, the PNC 1010 and/or devices 1022-1028 can communicate beacons and/or data using short-duration pulses that span a wide range of frequencies. In one example, transmissions made pursuant to UWB can occupy a spectrum of greater than 20% of a center frequency utilized by the network or a bandwidth of at least 500 MHz. Accordingly, UWB transmissions can be conducted using a very low power level (e.g., approximately 0.2 mW), which can allow UWB transmission to be conducted in common bands with other forms of communication without introducing significant interference levels. Because UWB operates at a low power level, it should be appreciated that UWB is typically confined to a small coverage area (e.g., approximately 10 to 100 meters), which can correspond to the coverage area of an associated piconet. However, by transmitting in short radio bursts that span a large frequency range, devices utilizing UWB can transmit significantly large amounts of data without requiring a large amount of transmit power. Further, because of the large bandwidth range and low transmit power used in UWB transmission, signals transmitted utilizing UWB can carry through obstacles that can reflect signals at lower bandwidth or higher power.

Turning now to FIG. 11, various aspects of the global system for mobile communication (GSM) are illustrated. GSM is one of the most widely utilized wireless access systems in today's fast growing communications systems. GSM provides circuit-switched data services to subscribers, such as mobile telephone or computer users. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

As one of ordinary skill in the art can appreciate, the exemplary GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1×Evolution Data Optimized ("EVDO"), Code Division Multiple Access-2000 ("cdma2000 3×"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the timing synchronization techniques described herein may be applied independently of the method of data transport, and does not depend on any particular network architecture or underlying protocols.

FIG. 11 depicts an overall block diagram of an exemplary packet-based mobile cellular network environment, such as a GPRS network, in which the claimed subject matter can be practiced. Such an environment can include a plurality of Base Station Subsystems (BSS) 1100 (only one is shown), each of which can comprise a Base Station Controller (BSC) 1102 serving one or more Base Transceiver Stations (BTS) such as BTS 1104. BTS 1104 can serve as an access point where mobile subscriber devices 1150 become connected to the wireless network. In establishing a connection between a mobile subscriber device 1150 and a BTS 1104, one or more timing synchronization techniques as described supra can be utilized.

In one example, packet traffic originating from mobile subscriber 1150 is transported over the air interface to a BTS 1104, and from the BTS 1104 to the BSC 1102; the traffic can be transported using the sequences as described herein, in one example. Base station subsystems, such as BSS 1170, are a part of internal frame relay network 1110 that can include Service GPRS Support Nodes ("SGSN") such as SGSN 1112 and 1114. Each SGSN is in turn connected to an internal packet network 1120 through which a SGSN 1112, 1114, etc., can route data packets to and from a plurality of gateway GPRS support nodes (GGSN) 1122, 1124, 1126, etc. As illustrated, SGSN 1114 and GGSNs 1122, 1124, and 1126 are part of internal packet network 1120. Gateway GPRS serving nodes 1122, 1124 and 1126 can provide an interface to external Internet Protocol ("IP") networks such as Public Land Mobile Network ("PLMN") 1145, corporate intranets 1140, or Fixed-End System ("FES") or the public Internet 1130. As illustrated, subscriber corporate network 1140 can be connected to GGSN 1122 via firewall 1132; and PLMN 1145 can be connected to GGSN 1124 via boarder gateway router 1134. The Remote Authentication Dial-In User Service ("RADIUS") server 1142 may also be used for caller authentication when a user of a mobile subscriber device 1150 calls corporate network 1140.

Generally, there can be four different cell sizes in a GSM network—macro, micro, pico, and umbrella cells. The coverage area of each cell is different in different environments. Macro cells can be regarded as cells where the base station antenna is installed in a mast or a building above average roof top level. Micro cells are cells whose antenna height is under average roof top level; they are typically used in urban areas. Pico cells are small cells having a diameter is a few dozen meters; they are mainly used indoors. On the other hand, umbrella cells are used to cover shadowed regions of smaller cells and fill in gaps in coverage between those cells.

The claimed subject matter has been described herein by way of examples. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Additionally, the disclosed subject matter can be implemented as a system, method, apparatus, or article of manufacture using standard programming and/or engineering techniques to produce software, firmware, hardware, or any combination thereof to control a computer or processor based device to implement aspects detailed herein. The terms "article of manufacture," "computer program product" or similar terms, where used herein, are intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, according to various permutations and combinations of the foregoing. Sub-components can also be implemented as components communicatively coupled to other components rather than included within parent components, e.g., according to a hierarchical arrangement. Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but generally known by those of skill in the art.

What is claimed is:

1. A system, comprising:
   at least one processor;
   at least one memory communicatively coupled to the at least one processor, the at least one memory having stored therein computer-executable instructions, comprising:
      a sequence application component configured to spread received data over one or more signals using one or more dual window sequences, wherein the one or more dual window sequences are part of a set of orthogonal sequences generated using an Oppermann transform; and
      a modulation component configured to modulate the one or more signals into a mixed signal; and
   a transmitter configured to transmit the mixed signal to one or more devices.

2. The system of claim 1, wherein the modulation component is configured to modulate the one or more signals into the mixed signal using M-ary phase shift keying.

3. The system of claim 2, further comprising a sequence generation component configured to create the set of orthogonal sequences having one or more properties of a Barker sequence.

4. The system of claim 1, wherein the one or more dual window sequences are configured to be recognizable for a delay in transmission of the mixed signal that is larger than half of a window size of the one or more dual window sequences.

5. The system of claim 1, wherein the transmitter is configured to transmit the mixed signal according to a code division multiple access specification.

6. The system of claim 1, wherein the transmitter is configured to transmit the mixed signals using a single-user quasi-synchronous spread spectrum communication.

7. A method, comprising:
   applying, by a system including a processor, one or more dual window sequences to one or more received signals, wherein the one or more dual window sequences are part of a set of orthogonal sequences generated using an Oppermann transform;
   modulating the one or more received signals having applied the one or more dual window sequences into a mixed signal; and transmitting the mixed signal to one or more devices in a wireless network.

8. The method of claim 7, further comprising generating the one or more dual window sequences.

9. The method of claim 7, wherein the one or more received signals are modulated into the mixed signal using M-ary phase shift keying.

10. The method of claim 7, wherein the one or more dual window sequences have one or more properties of a Barker sequence.

11. The method of claim 7, wherein the one or more dual window sequences are recognizable for a delay in transmission of the one or more received signals that is larger than half of a window size of the dual window sequences.

12. The method of claim 7, wherein transmitting the signals includes transmitting the signals according to a code division multiple access specification.

13. The method of claim 7, wherein transmitting the signals includes using a single-user quasi-synchronous spread spectrum communication with the one or more devices.

14. A system, comprising:
means for applying one or more dual window sequences to one or more signals for spreading thereof, wherein the one or more dual window sequences are part of a set of orthogonal sequences generated using an Oppermann transform; and
means for transmitting the one or more signals having applied the one or more dual window sequences to one or more devices.

15. The system of claim 14, wherein the set of orthogonal sequences has one or more properties of a Barker sequence.

16. The system of claim 14, further comprising means for generating the set of orthogonal sequences.

17. The system of claim 15, wherein the means for transmitting the signals utilizes a single-user quasi-synchronous spread spectrum communication.

18. A non-transitory computer-readable medium having instructions stored thereon that, in response to execution, cause at least one device to perform operations, comprising:
applying one or more dual window sequences to one or more received signals, wherein the one or more dual window sequences are part of a set of orthogonal sequences generated using an Oppermann transform;
modulating the one or more received signals having applied one or more dual window sequences into a mixed signal; and
transmitting the mixed signal to one or more devices in a wireless network.

19. The non-transitory computer-readable medium of claim 18, the operations further comprising generating the one or more dual window sequences.

20. The non-transitory computer-readable medium of claim 18, wherein the one or more received signals are modulated into a mixed signal using M-ary phase shift keying.

21. The non-transitory computer-readable medium of claim 18, wherein the one or more dual window sequences have one or more properties of a Barker sequence.

22. The non-transitory computer-readable medium of claim 18, wherein the one or more dual window sequences are recognizable for a characteristic of a delay in transmission of the one or more received signals larger than half of a window size of the dual window sequences.

23. The non-transitory computer-readable medium of claim 18, wherein transmitting the signals includes transmitting the signals according to a code division multiple access protocol.

24. The non-transitory computer-readable medium of claim 18, wherein transmitting the signals includes using a single-user quasi-synchronous spread spectrum communication with the one or more devices.

25. A system, comprising:
at least one processor;
at least one memory communicatively coupled to the at least one processor, the at least one memory having stored therein computer-executable instructions, comprising:
a sequence application component that spreads received data over one or more signals using one or more dual window sequences; and
a modulation component that modulates the one or more signals to form a mixed signal, wherein the one or more dual window sequences are recognizable for a delay in transmission of the mixed signal that is larger than half of a window size of the one or more dual window sequences; and
a transmitter that transmits the mixed signal to one or more devices.

26. A method, comprising:
applying, by a system including at least one processor and a memory, one or more dual window sequences to one or more received signals;
modulating the one or more received signals having applied one or more dual window sequences into a mixed signal, wherein the one or more dual window sequences are recognizable for a delay in transmission of the mixed signal that is larger than half of a window size of the one or more dual window sequences; and
transmitting the mixed signal to one or more devices in a wireless network.

27. A system, comprising:
means for applying dual window sequences to one or more signals for spreading thereof, wherein the dual window sequences are recognizable for a delay in transmission of the one or more signals that is larger than half of a window size of the dual window sequences; and
means for wirelessly transmitting the one or more signals to one or more devices.

28. A non-transitory computer-readable medium having instructions stored thereon that, in response to execution, cause a system including a processor to perform operations, comprising:
applying one or more dual window sequences to one or more received signals;
modulating the one or more received signals having applied one or more dual window sequences into a mixed signal, wherein the one or more dual window sequences are recognizable for a delay in transmission of the mixed signal that is larger than half of a window size of the one or more dual window sequences; and
transmitting the mixed signal to one or more devices in a wireless network.

* * * * *